US012420310B2

(12) United States Patent
Potter et al.

(10) Patent No.: US 12,420,310 B2
(45) Date of Patent: Sep. 23, 2025

(54) SEPARATION OF MATERIALS USING SORTING DEVICES

(71) Applicant: AMP Robotics Corporation, Louisville, CO (US)

(72) Inventors: Carson C. Potter, Denver, CO (US); Robert M. McKenna, Thornton, CO (US); Matthew J. Koos, Lakewood, CO (US); Dylan Welch, Aurora, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 18/669,874

(22) Filed: May 21, 2024

(65) Prior Publication Data

US 2024/0390946 A1 Nov. 28, 2024

Related U.S. Application Data

(60) Provisional application No. 63/468,155, filed on May 22, 2023.

(51) Int. Cl.
*B07C 5/342* (2006.01)
*B07C 5/36* (2006.01)

(52) U.S. Cl.
CPC ............ *B07C 5/3422* (2013.01); *B07C 5/363* (2013.01); *B07C 2501/0054* (2013.01)

(58) Field of Classification Search
CPC ....... B07C 5/342; B07C 5/3422; B07C 5/363; B07C 5/366; B07C 5/367; B07C 5/368; B07C 2501/0054
USPC .......................................................... 209/606
See application file for complete search history.

(56) References Cited

U.S. PATENT DOCUMENTS

| | | | | |
|---|---|---|---|---|
| 10,350,644 B1 * | 7/2019 | Doak | ...................... | B07C 5/368 |
| 2019/0126325 A1 * | 5/2019 | Tandon | ................. | B07C 5/3408 |
| 2020/0070209 A1 * | 3/2020 | Libralato | ................ | B07C 5/368 |
| 2024/0261822 A1 * | 8/2024 | Takeuchi | ................ | B07C 5/361 |

* cited by examiner

*Primary Examiner* — Michael McCullough
*Assistant Examiner* — Jessica L Burkman
(74) *Attorney, Agent, or Firm* — Van Pelt, Yi & James LLP

(57) ABSTRACT

Separation of materials using sorting devices is disclosed, including: receiving image data from sensors, wherein the image data corresponds to a set of objects being transported through a base sorting line; determining a subset of objects from the set of objects that are associated with a designated category based on the image data; sending a first set of data to a first sorting device to perform a diverting action on the subset of objects, wherein the first sorting device and a second sorting device are located along the base sorting line, wherein each of the first and second sorting devices is configured to perform diverting actions to separate materials associated with the designated category off from the base sorting line; and sending a second set of data to the second sorting device to perform a second action, wherein the second action is determined based on the image data.

28 Claims, 18 Drawing Sheets

SEPARATION OF MATERIALS USING SORTING DEVICES

CROSS REFERENCE TO OTHER APPLICATIONS

This application claims priority to U.S. Provisional Patent Application No. 63/468,155 entitled FLEXIBLE SEPARATION OF MATERIALS filed May 22, 2023 which is incorporated herein by reference for all purposes.

BACKGROUND OF THE INVENTION

One conventional way to separate objects in a sorting facility based on material category is using industrial screens. Such screens channel heterogeneous material down porous surfaces arranged in a decline, and use with a combination of sieving and vibrations to separate materials with different characteristics (e.g., density, size, and/or dimensions). However, industrial screens have large dimensions and therefore significant footprints. Moreover, industrial screens demand a high maintenance burden as they are easily clogged and need regular clean up. It would be desirable to separate materials in a more efficient and flexible manner.

BRIEF DESCRIPTION OF THE DRAWINGS

Various embodiments of the invention are disclosed in the following detailed description and the accompanying drawings.

DETAILED DESCRIPTION

Figure 1:
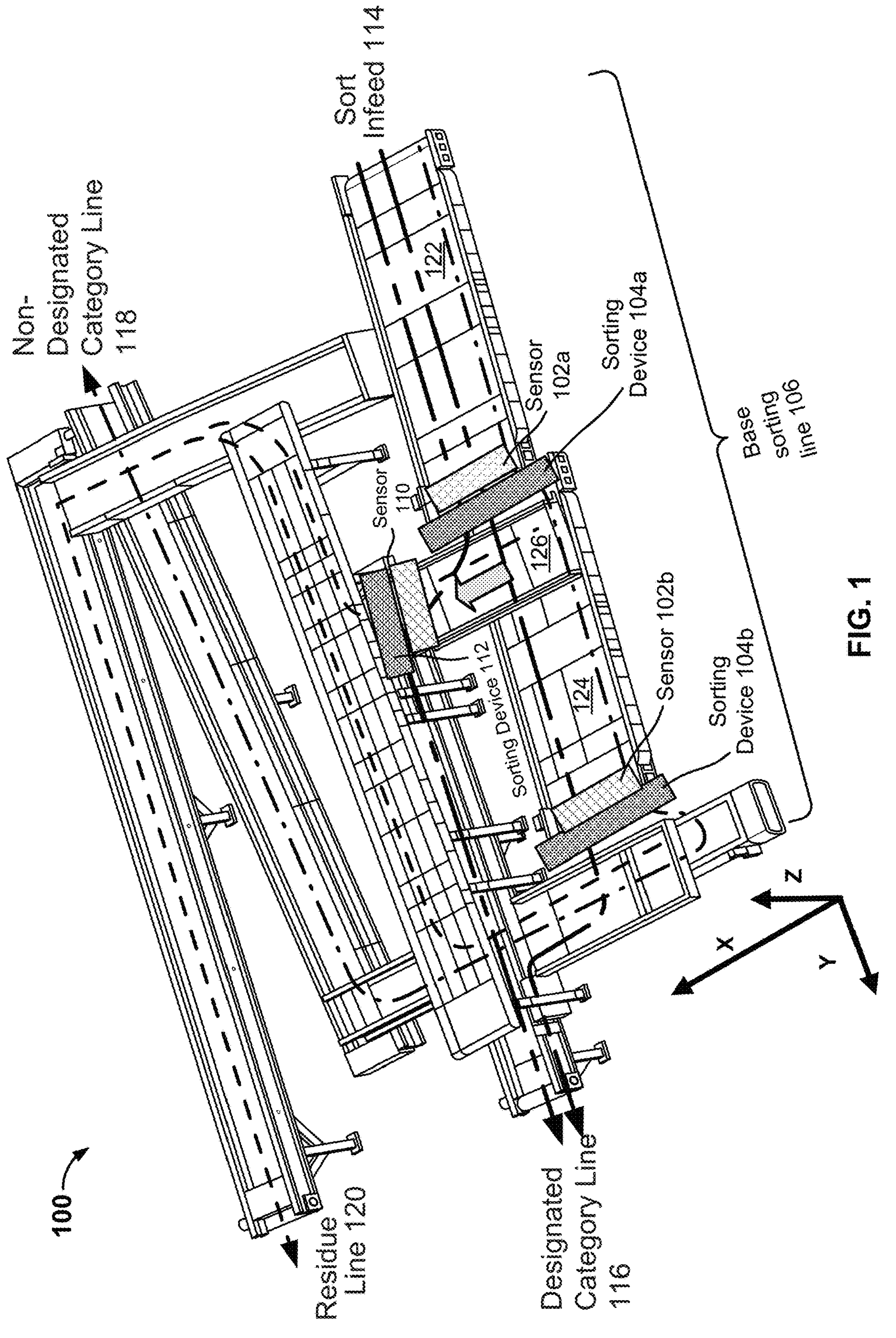
FIG. 1 is a diagram showing an example layout within a sorting facility that uses a series of sorting devices to separate objects of a designated category and objects not of the designated category.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of separation of materials using coordinated sorting devices are described herein. Image data corresponding to a set of objects being transported through a base sorting line is received. For example, the set of objects comprises a heterogeneous mix of materials that are deposited onto a series of conveyor devices that form a base sorting line in a sorting facility. In a specific example, the set of objects comprises single-stream waste. In various embodiments, the series of two or more sorting devices is located along the base sorting line. Each of the sorting devices in the series is configured to perform diverting actions to separate materials associated with a designated category away from the base sorting line. For example, the materials targeted by the sorting devices are diverted to other pathways of conveyor devices within the sorting facility that will eventually lead the diverted objects to designated category-related collection containers. From the image data, a subset of objects that are associated with the designated category is determined. A first set of data (e.g., comprising identification of the subset of objects and/or a control instruction) is sent to a first sorting device in the series of sorting devices to cause the first sorting device to perform a first action comprising a diverting action on the subset of objects. A second set of data (e.g., identification of the subset of objects and/or a control instruction) is sent to a second sorting device in the series to cause the second sorting device to perform a second action that is determined based at least in part on the image data. In some embodiments, the second action is a coordinated action relative to the first action.

In various embodiments, sensed data (e.g., images and/or hyperspectral data) on objects that are being conveyed through a sorting facility is obtained. The sensed data is evaluated to determine the subset of objects that are of a designated category and those that are not of the designated category. In one example scenario, the designated category is two-dimensional (2D) objects. Examples of 2D objects are light density objects and/or flat objects. Specific examples of 2D objects include cardboard, papers, and plastic films. Objects that are not 2D objects include three-dimensional (3D) objects. Specific examples of 3D objects include containers, ferrous materials, and non-ferrous materials. As the objects are transported on a conveyor device, the objects of the designated category (e.g., 2D objects) are diverted to a first pathway (e.g., a first series of conveyor devices) by a series of sorting devices along a base sorting line and the objects that are not of the designated category (e.g., 3D objects) are diverted to a second pathway (e.g., a second series of conveyor devices) within the sorting facility. In some embodiments, the objects of the designated category are diverted to a first pathway associated with processing 2D objects as the objects fall off of the end of a conveyor device and are fired upon by a stream of air from one or more sorting devices that each comprises a controllable array of air jets. In some embodiments, an "array of air jets" comprises an array of air valves and in which each air valve can be activated to emit an airflow (e.g., of a specified pressure and/or for a specified length of time ("dwell time")) independently of other air valves in the same array. In some embodiments, a sorting device that employs an array of air jets is sometimes referred to as an "air jet array sorting device." For example, 2D objects can be fired upon in a direction that is away from the floor such that the fired upon 2D objects are directed/pushed up towards this first pathway (e.g., series of conveyor devices) and non-2D objects (e.g., 3D objects and residue) that are not fired upon drop down (e.g., via gravity) to a second pathway (e.g., series of conveyor devices). In some embodiments, prior to reaching the sorting devices that perform the separation/split of objects of a designated category (e.g., 2D objects) and objects that are not of the designated category (e.g., 3D objects and other non-2D objects), the materials are first subjected to an infeed process comprising at least shredding by a reducer (which shreds objects into smaller pieces) and then being filtered through a fines screen.

FIG. 1 is a diagram showing an example layout within a sorting facility that uses a series of sorting devices to separate objects of a designated category and objects not of the designated category. FIG. 1 shows a portion of sorting facility 100. In particular, FIG. 1 shows unseparated objects (e.g., heterogeneous materials) entering base sorting line 106 at sort infeed 114. Examples of heterogeneous materials include single-stream waste, construction waste, or organic items (e.g., vegetables, fruit, or other food). Base sorting line 106 comprises a series of two or more conveyor devices that transport the materials input at sort infeed 114 as a subset of the materials that match the materials and/or object types that are associated with a designated category that are diverted by a series of sorting devices (sorting device **104*a* and sorting device 104*b*) to another pathway (e.g., another sorting line) of sorting facility 100. Sorting device 104*a* and sorting device 104*b* are each configured to work in concert to divert target objects matching a designated category away from base sorting line 106. As will be described below, ultimately, as a result of separating objects that belong and those that do not belong to the designated category using a combination of sensors and sorting devices arranged throughout the sorting facility, objects that belong to the designated category should be sorted onto designated category line 116, objects that do not belong to the designated category but are not residue (e.g., trash) should be sorted onto non-designated category line 118, and the remaining residue objects should be sorted onto residue line 120. Objects that are ultimately deposited onto designated category line 116 can be deposited into a designated category-related container (not shown) and/or further sorted into subcategories within the designated category before being collected. Objects that are ultimately deposited onto non-designated category line 118 can be deposited into a non-designated category-related container (not shown) and/or further sorted into subcategories within one or more non-designated categories before being collected. Objects that are ultimately deposited onto residue line 120** can be deposited into a trash compactor or trash collection (not shown).

In various embodiments, the input material stream is first transported across conveyor device 122 of base sorting line 106 along the Y-direction towards the sensor **102*a* and sorting device 104*a* pair. Sensor 102*a* is configured to capture (e.g., overhead) sensor data with respect to the input objects. For example, sensor 102*a* comprises a vision sensor (e.g., a camera) and/or a near infrared sensor. The sensor data is sent (e.g., over a network) by sensor 102*a* to a management control system (MCS) (not shown in FIG. 1**). In some embodiments, the MCS can be implemented as a single physical node (e.g., computing device) using one or more processors that execute computer instructions and where the sorting facility devices (e.g., sensors and sorting devices) communicate with the single node over a network.

Alternatively, the MCS can be implemented as a network of two or more physical nodes (e.g., computing devices) comprising one or more processors to execute computer instructions and where the network of two or more physical nodes is distributed throughout sorting facility 100. For example, where the MCS is implemented as multiple physical nodes, a physical node may be installed in proximity to a corresponding sensor and sorting device pair within sorting facility 100. The MCS is configured to evaluate the sensor data using machine learning models that have been trained on the one or more types of sensor data provided by sensor 102*a* to recognize the classification (e.g., including material type and/or object type) of each object within the sensor data (e.g., images). The MCS then compares each detected object's classification to criteria associated with a designated category and determines which object(s) correspond to the designated category and which objects do not. Where MCS determines that objects of the designated category are present within the sensor data from sensor 102*a*, the MCS can send data indicating such to one or both of sorting devices 104*a* and sorting device 104*b* for at least one of coordinated sorting device 104*a* and sorting device 104*b* to perform diverting actions on those designated category objects.

The input material that is not diverted by sorting device 104*a* away from base sorting line 106 continues to be transported by conveyor device 124 towards sensor 102*b* and sorting device 104*b* pair. For example, objects that correspond to the designated category that are not diverted by sorting device 104*a* have another chance to be diverted away from base sorting line 106 by sorting device 104*b*. In some embodiments, sensor 102*b* is configured to capture (e.g., overhead) sensor data with respect to the objects that remain on conveyor device 124 and send the sensor data to the MCS. Similar to what is described above, the MCS applies machine learning models to the sensor data to detect object(s) within the sensor data and determines which among the objects correspond to the designated category and which objects do not. Where MCS determines that objects of the designated category are present within the sensor data from sensor 102*b*, the MCS can send data indicating as such to sorting device 104*b* for sorting device 104*b* to potentially perform diverting actions on those designated category objects.

In some embodiments, one or both of sorting devices 104*a* and 104*b* comprise an air jet array sorting device and are configured to fire a controllable area of 2D air space over a time period as a target object (an object that corresponds to a designated category) falls off of a conveyor and crosses the array. This air stream fired over time by air jets of the sorting device creates a laminar flow that pushes on the target object and therefore changes its trajectory such that it will land on the desired pathway for designated objects. For example, where the designated category comprises 2D objects (e.g., paper, film, cardboard, card stock, newspapers, or other fiber-based materials), then a sorting device that comprises an air jet array can be positioned to point upwards (along the Z-direction) and fire the lightweight 2D objects upwards towards a higher desired pathway (e.g., target conveyor device). In this scenario, the non-2D objects (e.g., 3D objects and/or residue) are not fired upon by the air jet array sorting device(s) and passively fall onto one or more pathways intended for non-2D objects.

The objects from the input material stream that are actually diverted by sorting device 104*a* land onto conveyor device 126, which is located vertically higher (e.g., along the Z-direction) and also arranged transverse to or otherwise crosses conveyor devices 122 and 124. While only objects corresponding to the designated category are intended to be diverted by sorting device 104*a* onto conveyor device 126, it is possible for objects that do not correspond to the designated category to become inadvertently deflected by sorting device 104*a* and become deposited onto conveyor device 126. As such, in some embodiments, sensor 110 and sorting device 112 pair is configured to audit or perform quality control on the objects diverted by sorting device 104*a* from base sorting line 106 and onto conveyor device 126. Similar to sensors 102*a* and 102*b*, sensor 110 (comprising vision and/or infrared sensor(s)) is configured to capture (e.g., overhead) sensor data with respect to the objects on conveyor device 126 and send the sensor data to the MCS. Similar to what is described above, the MCS applies machine learning models to the sensor data to detect object(s) within the sensor data and determine which among the objects corresponds to the designated category and which objects do not. Where MCS determines that objects of the designated category are present within the sensor data from sensor 110, the MCS can send data indicating as such to sorting device 112 for sorting device 112 to use the data to potentially perform diverting actions on those designated category objects. In some embodiments, sorting device 112 can also be another instance of an air jet array sorting device in addition to the air jet array sorting device instances of sorting devices 104*a* and 104*b*. In the scenario described in FIG. 1, a sorting device performing diverting actions (e.g., via shooting air) on a designated category object is referred to as a "positive sort" and a sorting device performing diverting actions (e.g., via shooting air) on a non-designated category object is referred to as a "negative sort." As such, in contrast to sorting devices 104*a* and 104*b*, which perform "positive sorting" by targeting designated category objects conveyed along base sorting line 106 to guide them onto the pathway(s) of sorting facility 100 associated with the designated category (designated category line 116), quality control sorting device 112 performs a "negative sort" by targeting non-designated category objects that fall off conveyor device 126 to deflect them onto a pathway intended for non-designated category objects (non-designated category line 118) or alternatively, a residue line (residue line 120). In this way, sensor 110 and sorting device 112 can refine the composition of objects diverted by sorting device 104*a* away from base sorting line 106 by removing the subset of non-designated category objects from designated category line 116. In some other embodiments, quality control sorting device 112 performs a "positive sort" by targeting designated category objects that fall off conveyor device 126 to guide them onto the pathway(s) of sorting facility 100 that are related to the designated category such as designated category line 116. The additional (second pass) sorting on objects diverted off of base sorting line 106 that is performed by quality control sorting device 112 significantly improves the overall efficiency of material separation.

As shown in FIG. 1, the separation of items of a designated category and items not of that category can be performed using artificial intelligence to recognize items in a material stream, and then using a series of coordinated air jet array sorting devices to divert recognized items from that stream. This serialization of two or more air jet array sorting devices can be easily scaled up (e.g., the number of air jet array sorting devices in the series can be increased to support larger mass flows of materials through the sorting facility). As will be described in further detail below, the actions performed by the air jet array sorting devices can be coordinated by the MCS in part based on monitored sorting device behavior to result in load balancing to optimize for more precise separation, value maximization, and/or jet longevity. The coordinated actions of the air jet array sorting devices can also result in a division of material types to target, a division of areas along the width of a conveyor belt to shoot air, and intelligent scheduling of self-maintenance routines among the air jet array sorting devices, as will be described in further detail below. The performances of the air jet array sorting devices can be monitored and the resulting separation of materials can also be audited based on inflows and outflows relative to each air jet array sorting device, for example. The series of air jet array sorting devices are dynamically configurable (e.g., in response to detected events, like updated item values, detected jams, or changes in moisture) to maximize performance and minimize problems on base sorting line 106. The type of material separation can also be dynamically adapted to variations in the input material stream.

Figure 2:
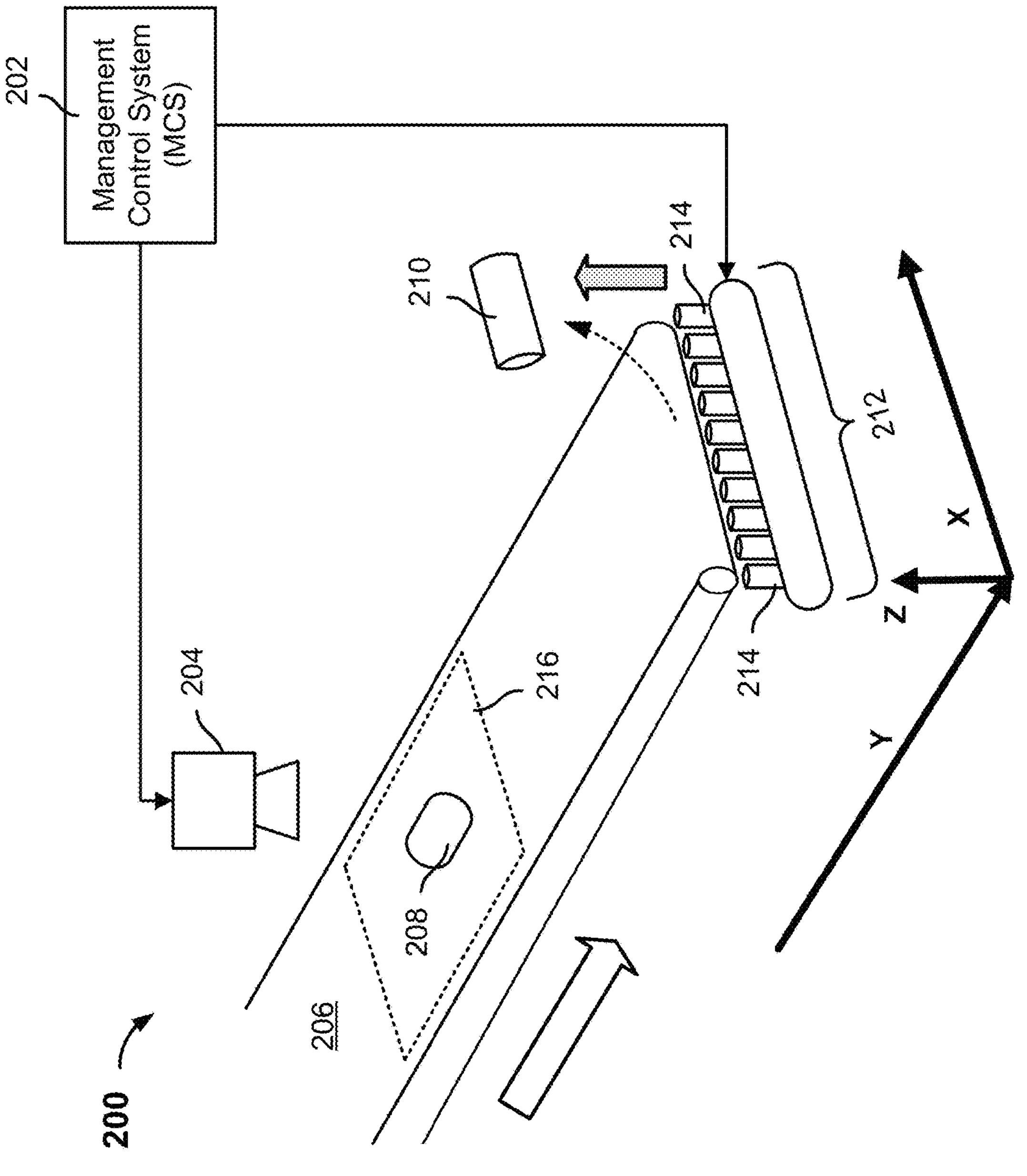
FIG. 2 is a diagram showing an example of a sorting system that uses a controllable air stream in accordance with some embodiments.

FIG. 2 is a diagram showing an example of a sorting system that uses a controllable air stream in accordance with some embodiments. In some embodiments, sorting system 200 can be used to implement any set of conveyor device, sensor, and air jet array sorting device (e.g., conveyor device 122, sensor 102*a*, and sorting device 104*a*; conveyor device 124, sensor 102*b*, and sorting device 104*b*; or conveyor device 126, sensor 110, and sorting device 112) that is shown in FIG. 1. Sorting system 200 includes conveyor device 206 that is configured to convey a material stream, including objects 208 and 210, through a portion of a sorting facility. As the objects (e.g., objects 208 and 210) are conveyed in the Y-direction by conveyor device 206 and before the objects fall off the end of conveyor device 206, sensor 204 is configured to capture an image of the objects on conveyor device 206. As shown in FIG. 2, sensor 204 is configured to (e.g., periodically) capture images of objects within its field of view 216 across conveyor device 206. In some embodiments, sensor 204 is an optical/vision sensor (e.g., a camera) and/or a near infrared sensor. The image or signals captured by sensor 204 are sent (e.g., over a network (not shown) or over a wired connection) to management control system (MCS) 202.

In some embodiments, MCS 202 can be implemented as a single physical node (e.g., computing device) using one or more processors that execute computer instructions and where the sorting facility devices communicate with the single node over a network. Alternatively, MCS 202 can be implemented as a network of two or more physical nodes (e.g., computing devices) comprising one or more processors to execute computer instructions and where the network of two or more physical nodes are distributed throughout the facility. In the event where there is a distributed network of physical nodes that form MCS 202, any number of networked vision sensors (e.g., such as sensor 204) and physical nodes of MCS 202 can be included in logical groupings that are sometimes referred to as "machine learning (ML) vision subsystems." For example, each ML vision subsystem comprises a processor configured to execute machine learning models for object identification, and include memory, networking capabilities, and a high-resolution camera.

As will be described in further detail below, MCS 202 is configured to apply machine learning to detect object(s) among images captured by sensor 204 and for a detected object, determine a classification of the object. In various embodiments, a "classification" of an object includes a set of attributes associated with the object (e.g., a material type, a location, a shape, a size, dimensions, a mass, a density, a priority, a condition, a form factor, a color, a polymer, and/or a brand) and if applicable, a characterization of the object in relation to a proximate neighboring object. MCS 202 is configured to compare each object's set of attributes to a configurable set of target object criteria (e.g., that describes objects that are targeted by a particular sorting device) and determine that an object that matches the target object criteria is a "target object" upon which a sorting device such as air jet array sorting device 212 is to be instructed to perform a sorting operation. In some embodiments, the set of target object criteria describes the attribute(s) associated with objects in a designated category. As such, air jet array sorting device 212 will fire on target objects that match the designated category criteria in a "positive sort" scheme and fire on non-target objects that do not match the designated criteria in a "negative sort" scheme.

In some embodiments, an airflow profile is selected for air jet array sorting device 212 to execute in performing a sorting operation on a target object. In various embodiments, an "airflow profile" describes a firing polygon that is to be executed by air jet array sorting device 212. In various embodiments, an air jet array sorting device such as air jet array sorting device 212 comprises an array of (e.g., 83) air jets 214 (e.g., air valves) that can be controlled to emit a controllable stream of air at a target object to propel the target object towards a desired destination (e.g., a target conveyor device or a bunker) as the target object falls off the end of conveyor device 206. The air stream that can be emitted by air jet array sorting device 212 is dynamically adjustable in air pressure and width, for example, as a function of time. In the example of FIG. 2, air jet array sorting device 212 comprises a linear array of air jets arranged (e.g., along the X-direction) across the width of conveyor device 206 and is located at the end of the conveyor belt in the direction of the belt's movement. In some embodiments, the X-direction crosses the Y-direction without necessarily being perpendicular to the Y-direction. In some embodiments, the X-direction intersects the Y-direction at a right angle. In some embodiments, MCS 202 is configured to select an airflow profile for a target object that matches the determined classification of the target object. The "firing polygon" that is included in each airflow profile defines at each of a series of points in time, which and how many air jets (e.g., a specified width) should fire (be activated to shoot positive airflow) and, optionally, at a specified air pressure. Put another way, the "firing polygon" corresponds to a 2D (across a plane in the X and Y directions) shape of air to be emitted by air jet array sorting device 212 over a period of time. An advantage of the 2D shape of air to be emitted by air jet array sorting device 212 over time is that it is a time-varying stream of air applied along a surface/dimension of a target object to ensure that appropriate force is directed at appropriate locations of the object to successfully guide the objects towards a desired direction. In some embodiments, MCS 202 is configured to modify the firing polygon of the selected airflow profile using the classification of the target object. The firing polygon can be modified in various ways in light of the classification of the target object. In a first example, the firing polygon can be shifted (e.g., along the X-direction) to match the detected location (e.g., along the X-direction) of the target object. In a second example, the firing polygon can be scaled up (e.g., the number of air jets to activate at each time is increased) to accommodate a larger 2D area/projection of the target object on the conveyor belt or scaled down (e.g., the number of air jets to activate at each time is decreased) to accommodate a smaller 2D area/projection of the target object on the conveyor belt based on the detected dimensions, shape, and/or size of the target object. In a third example, the firing polygon can be partially suppressed (e.g., one or more air jets are no longer activated at one or more points in time, which effectively modifies the 2D shape of the air stream) due to the proximity of an undesirable neighbor object.

In addition to determining the firing polygon for a target object, MCS 202 is also configured to predict a "start time" at which the target object is to start passing across the array of air jets of air jet array sorting device 212. In some embodiments, the region over which the array of air jets can emit airflow is referred to as "the controllable air stream target region." In some embodiments, MCS 202 is configured to determine this "start time" using the known speed of conveyor device 206 along the Y-direction, the target object's current location along the Y-direction, and/or other calibrations.

MCS 202 is configured to send the selected airflow profile, the modifications to the firing polygon, and the predicted start time to air jet array sorting device 212 (e.g., over a network or a wired connection, neither shown). In response, air jet array sorting device 212 is configured to perform a sorting operation on the target object by starting execution of the firing polygon at the predicted start time, which will result in shooting the corresponding 2D shape of air across the time duration as specified by the firing polygon at the target object. While not shown in FIG. 2, in some embodiments, air jet array sorting device 212 is configured to include a local, embedded controller that translates the selected airflow profile and/or firing polygon control instructions from MCS 202 into instructions necessary to control the air jet array, associated LEDs, or other proprietary devices in the system (e.g., an actuator), as will be described in further detail below.

For example, referring to FIG. 2, object 210 appears within an image captured by sensor 204. MCS 202 receives the image and then determines a classification for object 210. MCS 202 further determines that object 210 matches target object criteria comprising designated category criteria. In a specific example, the designated category comprises 2D objects and as such, the designated category criteria may describe the attributes such as object types, material types, and material densities in an object's classification that map to the designated category. Example material types that map to the designated category of 2D objects include fiber-based materials (e.g., paper, cardboard, card stock) and plastic film type materials (e.g., plastic bags). MCS 202 then selects an airflow profile of object 210 and modifies the firing polygon included in the airflow profile based on the classification of object 210. MCS 202 is further configured to predict a start time at which object 210 is to start to cross over the controllable air stream target region of air jet array sorting device 212. MCS 202 sends the selected airflow profile, the modifications to the firing polygon, and the predicted start time to air jet array sorting device 212. Air jet array sorting device 212 then starts to activate the air jets of the array that are described to fire at the first point in time of the firing polygon at/near the predicted start time so as to result in the successful deflection of object 210 in the desired upwards (e.g., along the Z-direction) direction towards a designated category pathway. The desired direction could lead to a target conveyor device or a collection container.

An object that is not recognized by MCS 202 to be a target object (e.g., a non-designated category object) would not be fired upon by air jet array sorting device 212 and instead, fall off the end of conveyor device 206 into a non-designated category conveyor device that conveys the object towards other non-designated category sorting opportunities, potentially. While not shown in FIG. 2, one or more instances of a conveyor device, an overhead sensor, and an air jet array sorting device 212 may be located along the Y-direction downstream of conveyor device 206 to continue to circulate and potentially divert objects that are not fired upon by air jet array sorting device 212.

While air jet array sorting device 212 is shown in FIG. 1 to shoot air upwards to deflect objects, in other examples, an air jet array sorting device can be placed above conveyor device 206 and configured to shoot air downwards to deflect objects in that direction.

In various embodiments, the firing and/or self-maintenance behavior of air jet array sorting device 212 is dependent on the firing and/or self-maintenance behavior of one or more other sorting devices with which air jet array sorting device 212 is in a series along a base sorting line within a sorting facility. As will be described in further detail below, the coordinated behavior of a series of sorting devices that are all configured to target designated category objects along the base sorting line is coordinated by a central entity such as MCS 202. In some instances of coordinated behavior, a sorting device in the series may even forgo firing on a target designated category object due to an effort to load balance firing rates among the coordinated sorting devices, to avoid firing on the target designated category object because its particular object type and/or location on the conveyor device is assigned to be targeted by a downstream sorting device in the series, and/or to opportunistically implement a self-maintenance routine.

Figure 3:
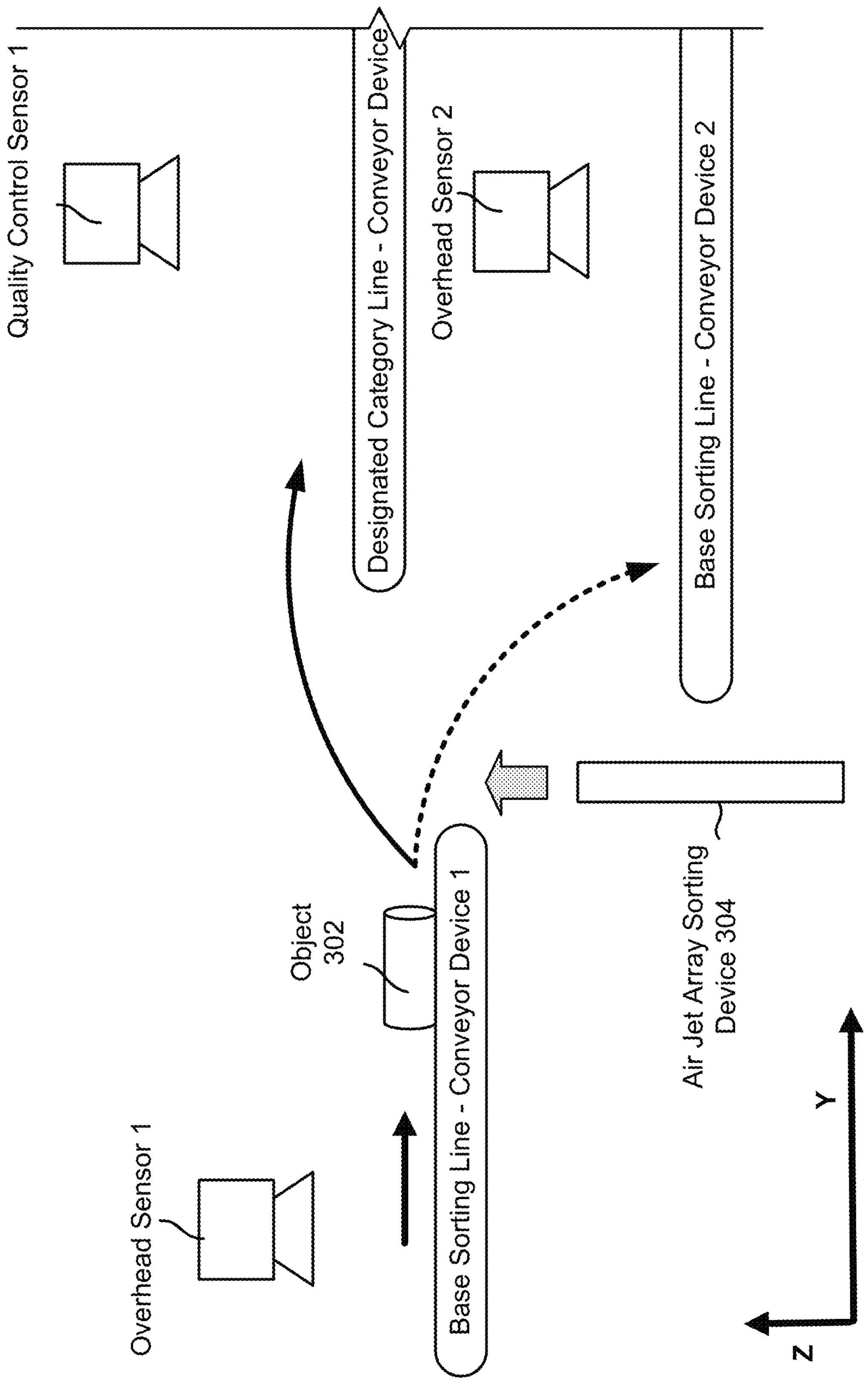
FIG. 3 shows an example air jet array sorting device (Air Jet Array Sorting Device 304) that is arranged (in the X-direction which extends into the page) across the width of Base Sorting Line—Conveyor Device 1 (e.g., at the end of the belt from which objects fall off), with its air jets aimed to selectively fire on a target object that matches a designated category in the direction of Designated Category Line—Conveyor Device that will transport the material towards a collection container and/or additional sorting for subcategories within the designated category.

FIG. 3 shows an example air jet array sorting device (Air Jet Array Sorting Device 304) that is arranged (in the X-direction which extends into the page) across the width of Base Sorting Line—Conveyor Device 1 (e.g., at the end of the belt from which objects fall off), with its air jets aimed to selectively fire on a target object that matches a designated category in the direction of Designated Category Line—Conveyor Device that will transport the material towards a collection container and/or additional sorting for subcategories within the designated category. In FIG. 3, the designated category comprises 2D objects and so an air jet array sorting device's firing actions propel 2D target objects that fall off a first conveyor belt in a vertically higher direction, ending up on a higher conveyor belt that is associated with a designated category pathway (Designated Category Line—Conveyor Device), while non-diverted objects land on a subsequent conveyor belt in the base sorting line, Base Sorting Line—Conveyor Device 2, on a lower level than Base Sorting Line—Conveyor Device 1 to be potentially sorted downstream. While not shown in FIG. 3, Designated Category Line—Conveyor Device conveys in a direction transverse to the direction conveyed by Base Sorting Line—Conveyor Device 1 and Base Sorting Line—Conveyor Device 2. For example, while Base Sorting Line—Conveyor Device 1 and Base Sorting Line—Conveyor Device 2 convey objects along the Y-direction, Designated Category Line—Conveyor Device conveys objects along the X-direction. Specifically, in FIG. 3, Overhead Sensor 1 captures an overhead image of objects such as Object 302 on Base Sorting Line—Conveyor Device 1. The MCS (not shown) will apply machine learning model(s) to the overhead image to determine whether the attributes (e.g., material type, object type) of Object 302 match the 2D object criteria of Air Jet Array Sorting Device 304. In the event that the attributes of Object 302 match the 2D object criteria of Air Jet Array Sorting Device 304, the MCS will instruct Air Jet Array Sorting Device 304 to fire on Object 302 (e.g., by executing a selected airflow profile) as it falls off Conveyor Device 1 to cause Object 302 to be propelled upwards to Designated Category Line—Conveyor Device, which is configured to convey material towards a collection container for 2D materials and/or refined sorting among 2D materials. In the event that the attributes of Object 302 do not match the 2D object criteria of Air Jet Array Sorting Device 304, the MCS will not instruct Air Jet Array Sorting Device 304 to fire on Object 302 and it will fall off Base Sorting Line—Conveyor Device 1 and then land on Base Sorting Line—Conveyor Device 2. In the example scenario where the designated category comprise 2D objects, 2D objects are usually lightweight or less dense in nature and more amenable to be propelled upwards by laminar airflow as compared to 3D objects. Therefore, in the example scenario where the designated category comprises 2D objects, air jet array sorting device 304 can be positioned to shoot air upwards to propel 2D objects onto a 2D object conveyor device, while the heavier or more dense 3D objects can be ignored by air jet array sorting device 304 and fall onto the lower, next conveyor device in the base sorting line (Base Sorting Line—Conveyor Device 2).

If Object 302 were to be fired on by Air Jet Array Sorting Device 304 and land on Designated Category Line—Conveyor Device, then Quality Control Sensor 1 captures an overhead image of Object 302 (potentially along with other objects on the same conveyor belt) and the MCS will again check whether the attributes of Object 302 match the 2D object criteria. For objects transported along Designated Category Line—Conveyor Device that do not match the 2D object criteria, a downstream quality control sorting device (not shown) can perform negative sorting by removing the non-2D objects from Designated Category Line—Conveyor Device or as such objects fall off of Designated Category Line—Conveyor Device.

If Object 302 were not fired on (or not successfully fired on) by Air Jet Array Sorting Device 304 and landed on Base Sorting Line—Conveyor Device 2, then Overhead Sensor 2 captures an overhead image of Object 302 (potentially along with other objects on the same conveyor belt) and the MCS will again check whether the attributes of Object 302 match the 2D object criteria. For objects transported along on Base Sorting Line—Conveyor Device 2 that match the 2D object criteria, a downstream sorting device (not shown) that is controlled in coordination with Air Jet Array Sorting Device 304 can perform positive sorting by removing the non-2D objects from Base Sorting Line—Conveyor Device 2 or as such objects fall off of Base Sorting Line—Conveyor Device 2.

Figure 4:
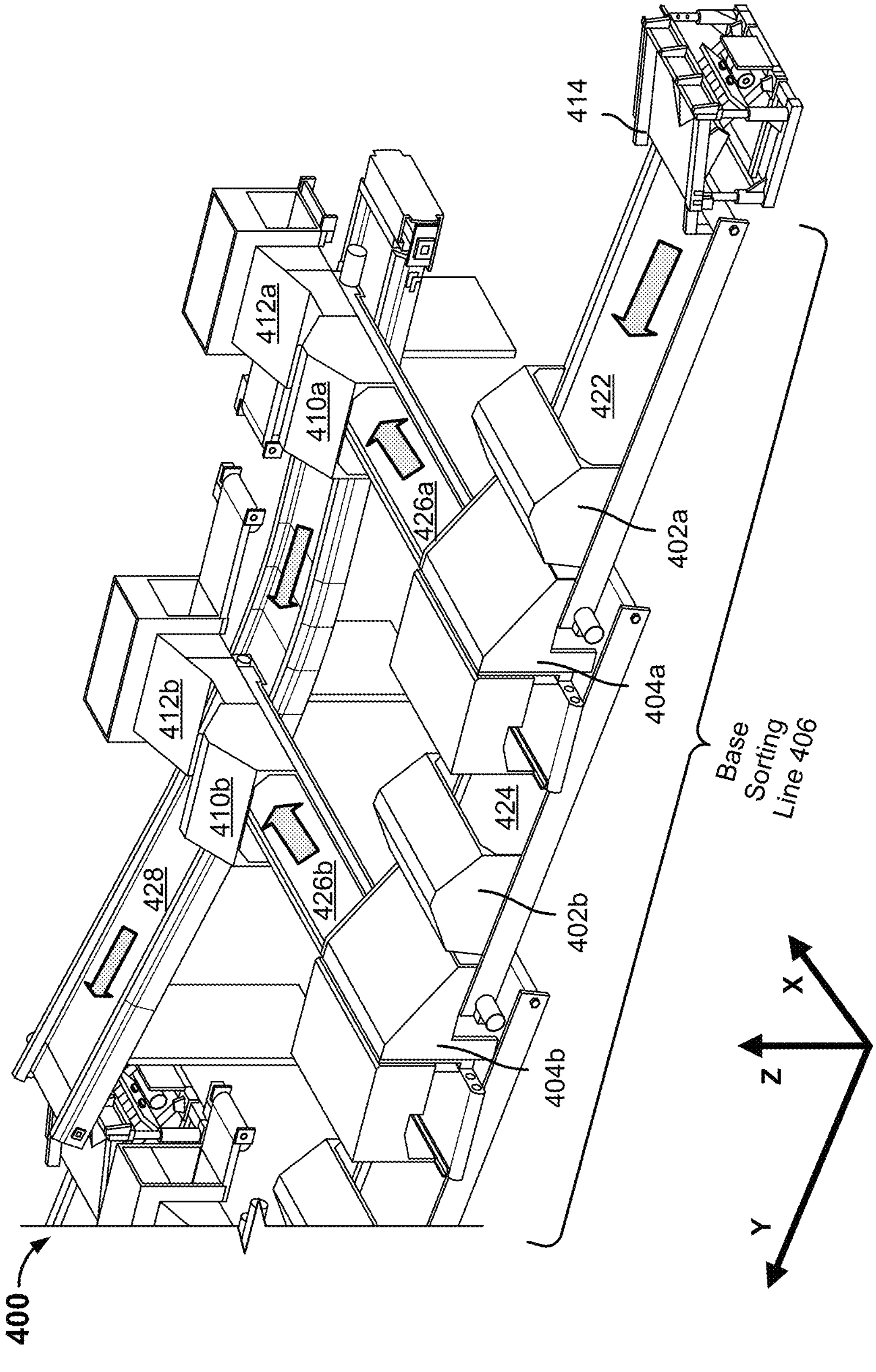
FIG. 4 is a diagram showing another example layout within a sorting facility that uses a series of sorting devices to separate objects of a designated category and objects not of the designated object.

FIG. 4 is a diagram showing another example layout within a sorting facility that uses a series of sorting devices to separate objects of a designated category and objects not of the designated object. FIG. 4 shows a portion of sorting facility 400. The portion of sorting facility 400 that is shown in FIG. 4 is similar to the portion of sorting facility 100 that was shown in FIG. 1. One difference between the layouts shown in FIG. 1 and FIG. 4 is that in FIG. 4, each sensor (sensor 402*a*, sensor 402*b*, sensor 410*a*, and sensor 410*b*) and each sorting device (sorting device 404*a*, sorting device 404*b*, sorting device 412*a*, and sorting device 412*b*) is shown to be covered by a corresponding hood. Another difference between the layouts shown in FIG. 1 and FIG. 4 is that FIG. 4 includes two transverse conveyor devices (conveyor devices 426*a* and 426*b*) for transporting designated category objects diverted by serial sorting devices (sorting device 404*a*, sorting device 404*b*) arranged along base sorting line 406 that each leads to a corresponding pair of a sensor and sorting device (sensor 410*a* and sorting device 412*a*; sensor 410*b* and sorting device 412*b*) that are configured to perform quality control/negative sorting on the objects that fall off conveyor devices 426*a* and 426*b*.

In the example layout of FIG. 4, sort infeed 414 deposits a heterogeneous stream of materials (e.g., that was previously passed through a round of residue removal) onto conveyor device 422 of base sorting line 406. Sensor 402*a* captures sensor images of the objects and the images are evaluated using machine learning models by the MCS (not shown) and the subset of objects that are determined to match target, designated category object criteria are candidate objects to be diverted by sorting device 404*a* onto conveyor device 426*a*. In various embodiments, whether the candidate objects are fired upon by sorting device 404*a* depends in part on the diverting/firing behavior and/or maintenance needs of other downstream sorting device(s) along base sorting line 406 with which sorting device 404*a* is in a series. In a first example, if the current firing load (e.g., quantity of targeted objects) of sorting device 404*a* is to be load balanced (e.g., to reduce the strain on sorting device 404*a* and/or reduce the amount of air turbulence created by frequent firing of the air jets), then sorting device 404*a* may be instructed by the MCS to omit performing diverting actions on one or more designated category objects that cross its firing region. In a second example, if sorting device 404*a* needs to perform self-maintenance (e.g., due to a detected clog or the elapse of a maintenance period) in the form of blowing positive airflow according to a prescribed set of instructions, then sorting device 404*a* may be instructed by the MCS to omit performing diverting actions on one or more designated category objects that cross its firing region as it is performing maintenance. The designated category objects that are not successfully diverted or intentionally not diverted by sorting device 404*a* land on the next conveyor device, conveyor device 424, of base sorting line 406. Sensor 402*b* captures sensor images of the objects conveyed on conveyor device 424 and the images are evaluated using machine learning models by the MCS (not shown) and the subset of objects that are determined to match the target, designated category object criteria are candidate objects to be diverted by sorting device 404*b* onto conveyor device 426*b*. Similar to what was described above, whether the candidate objects are fired upon by sorting device 404*b* depends in part on the diverting/firing behavior and/or maintenance needs of other upstream sorting device 404*a* and downstream sorting device(s) along base sorting line 406 with which sorting device 404*a* is in a series. In one example, if the firing rate of upstream sorting device 404*a* was reduced in an effort to load balance or temporarily ceased to perform maintenance, then downstream sorting device 404*b* can be instructed by the MCS to more aggressively fire (e.g., fire more frequently) and/or target a greater number of designated category objects.

The objects that are diverted by sorting device 404*a* onto conveyor device 426*a* are then quality controlled by sensor 410*a* and sorting device 412*a*, which is configured to perform a negative sort by removing non-designated category objects away (onto a pathway that is not shown in FIG. 4) from conveyor device 428, onto which the objects not fired upon by sorting device 412*a* land and which is designed to convey only designated category objects. Similarly, the objects that are diverted by sorting device 404*b* onto conveyor device 426*b* are then quality controlled by sensor 410*b* and sorting device 412*b*, which is configured to perform a negative sort by removing non-designated category objects away (onto a pathway that is not shown in FIG. 4) from conveyor device 428, onto which the objects not fired upon by sorting device 412*b* land and which is designed to convey only designated category objects. In some other examples, quality control sorting devices, sorting device 412*a* and sorting device 412*b*, can perform positive sorting to fire on designated objects to push them towards a pathway associated with designated category objects.

Figure 5:
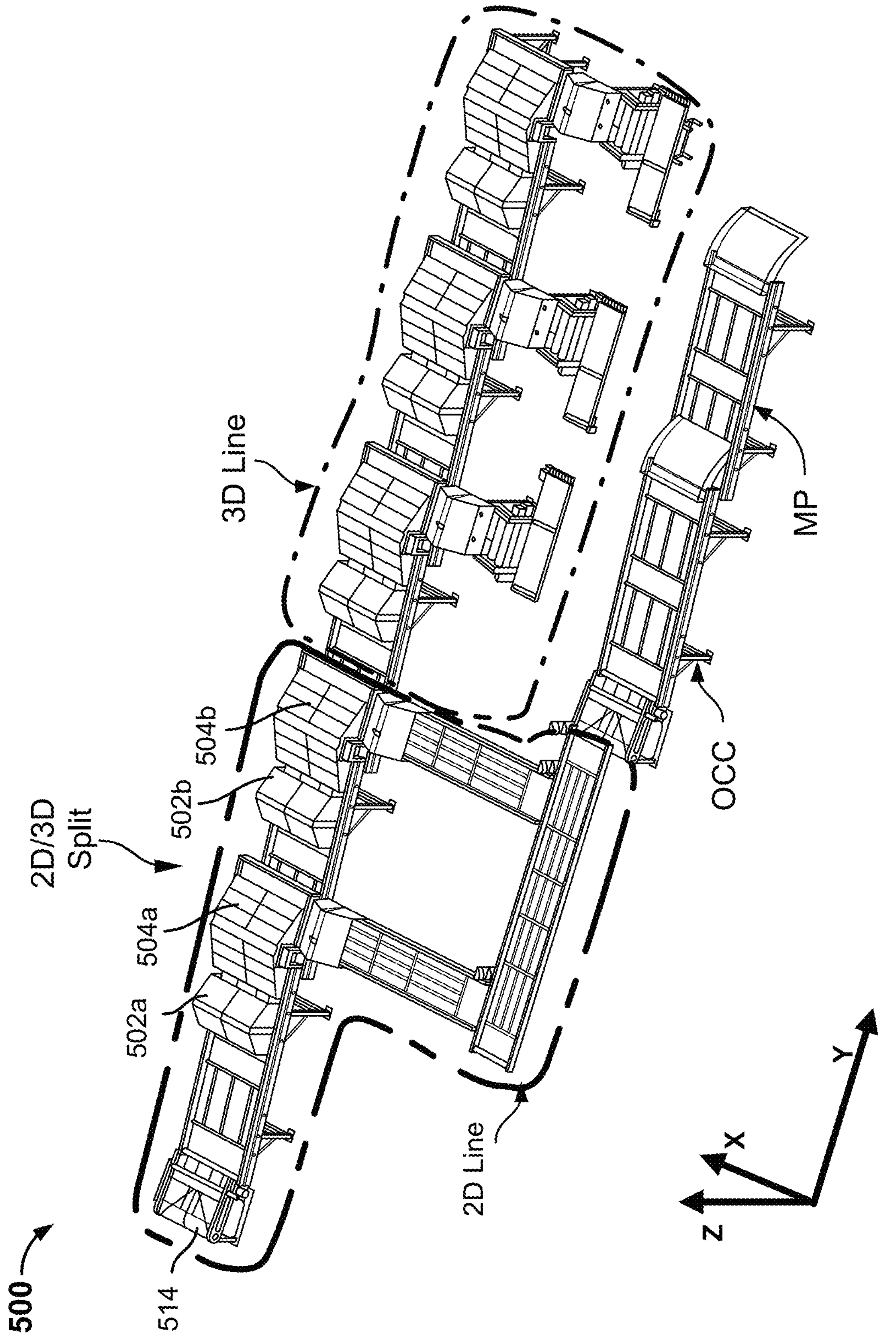
FIG. 5 is a diagram showing yet another example layout within a sorting facility that uses a series of sorting devices to separate objects of a designated category and objects not of the designated object.

FIG. 5 is a diagram showing yet another example layout within a sorting facility that uses a series of sorting devices to separate objects of a designated category and objects not of the designated object. FIG. 5 shows a portion of sorting facility 500. The portion of sorting facility 500 that is shown in FIG. 5 is similar to the portion of sorting facility 400 that was shown in FIG. 4 except that FIG. 5 shows a bird's eye view of the facility. FIG. 5 shows an example scenario in which a series of sorting devices (sorting devices 504*a* and 504*b*) arranged along a base sorting line are coordinated to split 2D objects from 3D objects in an input material stream from sort infeed 514. In particular, the series comprising sorting devices 504*a* and 504*b* are configured to split 2D objects from 3D objects in an input material stream by diverting 2D objects onto transverse conveyor devices, while non-divert 3D objects continue to be transported by a series of conveyor devices along the base sorting line. As shown in FIG. 5, the diverted 2D objects are eventually transported in the 2D Line to 2D-related processing mechanisms such as an OCC (old corrugated cardboard) screen and an Mixed Paper mechanism. The 3D objects are eventually transported in the 3D Line to 3D-related processing mechanisms such as sorting according to specific material types (e.g., aluminum cans, plastic bottles, glass containers) related to 3D objects.

Figure 6A:
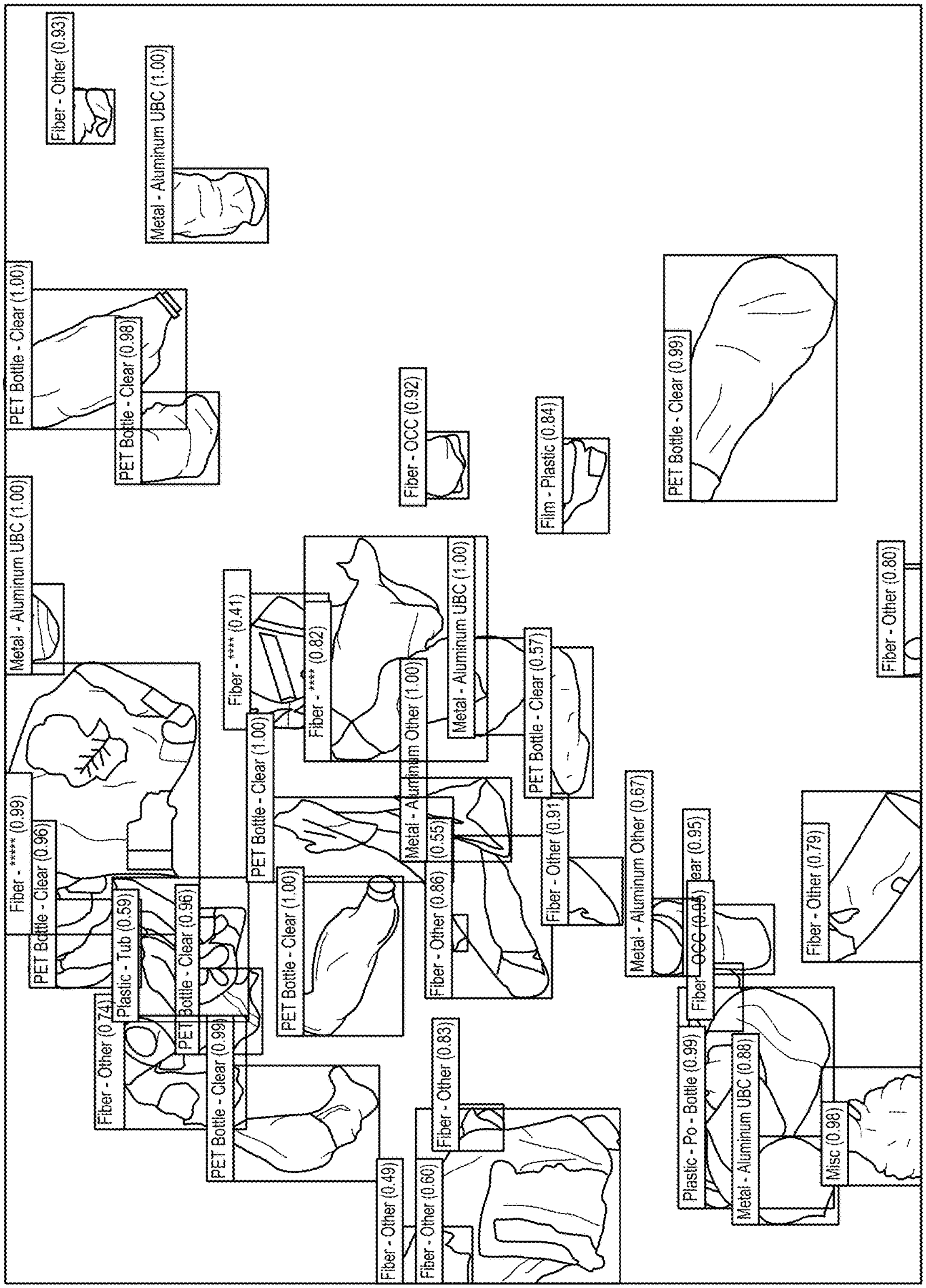
FIG. 6A is an example image that is captured by a vision sensor of a heterogeneous stream of materials that has not yet been separated into those that correspond to a designated category and those that do not correspond to the designated category.

FIG. 6A is an example image that is captured by a vision sensor of a heterogeneous stream of materials that has not yet been separated into those that correspond to a designated category and those that do not correspond to the designated category. For example, the example image of FIG. 6A could have been captured by an overhead sensor early in a base sorting line that is lined with a series of sorting devices that are configured to divert/separate objects that are identified to correspond to a designated category (comprising 2D objects) such as sensor 102*a* of FIG. 1, Overhead Sensor 1 of FIG. 3, sensor 402*a* of FIG. 4, and sensor 502*a* or FIG. 5. As shown in FIG. 6, machine learning models have analyzed the image and identified the outline or bounding boxes around each object within the image, as well as other attributes such as each object's material type. In FIG. 6A each detected object within the image is labeled with the object's determined material type and a confidence value (between 0 and 1) associated with the material type determination. Because the image of FIG. 6A is captured by a sensor prior to the separation of 2D and non-2D objects, the image shows material types that map to 2D objects and also material types that map to non-2D (e.g., 3D) objects. Examples of material types that map to 2D objects include various types of fiber and film. Examples of material types that map to non-2D objects include various types of PET (Polyethylene terephthalate) bottles, metal, and plastic.

Figure 6B:
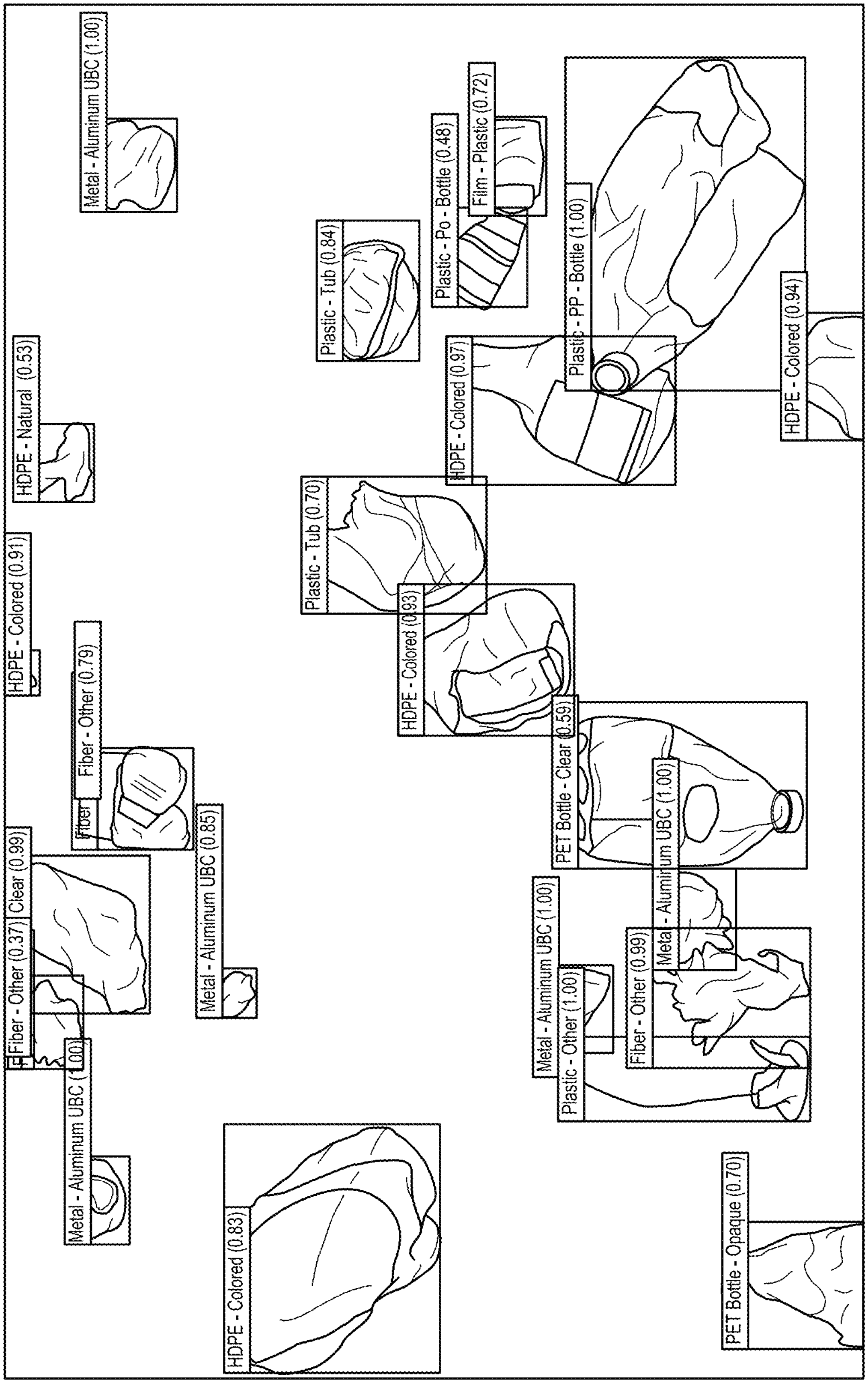
FIG. 6B is an example image that is captured by a vision sensor of a stream of non-designated category materials after their separation from the heterogeneous mix of materials.

FIG. 6B is an example image that is captured by a vision sensor of a stream of non-designated category materials after their separation from the heterogeneous mix of materials. For example, the example image of FIG. 6B could have been captured by an overhead sensor later in a base sorting line that is lined with a series of sorting devices that are configured to divert/separate objects that are identified to correspond to a designated category (comprising 2D objects) such as sensor 102*b* of FIG. 1, Overhead Sensor 2 of FIG. 3, sensor 402*b* of FIG. 4, and sensor 502*b* or FIG. 5. As shown in FIG. 6B, machine learning models have analyzed the image and identified the outline or bounding boxes around each object within the image, as well as other attributes such as each object's material type. In FIG. 6B, each detected object within the image is labeled with the object's determined material type and a confidence value (between 0 and 1) associated with the material type determination. Because the image of FIG. 6B is captured by a sensor along the base sorting line after the diversion of 2D objects by at least one sorting device away from the base sorting line, the image shows mostly material types that map to 3D objects such as HDPE (High-density polyethylene), metal, plastic, and PETs.

Figure 7:
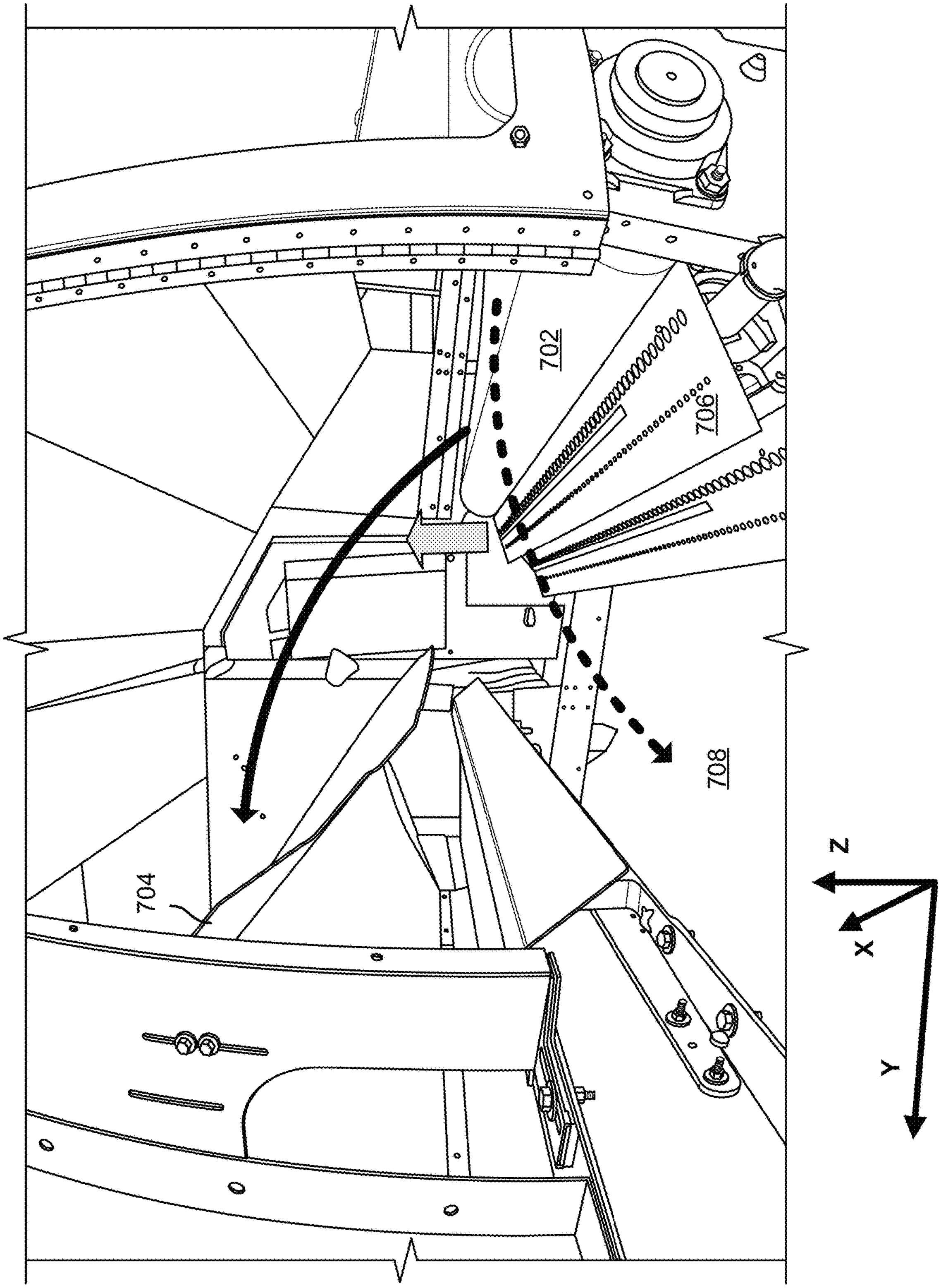
FIG. 7 is a diagram showing an air jet array sorting device at a junction among conveyor devices.

FIG. 7 is a diagram showing an air jet array sorting device at a junction among conveyor devices. In particular, the diagram of FIG. 7 shows an example of what is under a hood that covers an air jet array sorting device such as the sorting devices that are shown in FIGS. 4 and 5. Air jet array sorting device 706 comprises a series of air valves that are positioned in the X-direction across the end of conveyor device 702, which is part of a base sorting line that transports a stream of objects that are to be separated into those that correspond to a designated category and those that do not correspond to the designated category. In the example of FIG. 7, air jet array sorting device 706 is configured to fire upwards along the Z-direction on a designated category object as the object falls off of conveyor device 702 by executing a selected airflow profile that corresponds to the classification of that object. The fired upon object should be propelled vertically to land on conveyor device 704. However, air jet array sorting device 706 will not fire on a non-designated category object that falls off of conveyor device 702 and therefore, the object will land on conveyor device 708.

In various embodiments, the system works by arranging a series of two or more sorting devices. In some embodiments, each sorting device in the series is an air jet array sorting device. In some embodiments, the series of sorting devices are arranged back-to-back in a row. The sorting devices will each target 2D items and operate at very high duty (e.g., the air jets are fired at a high firing rate). The result of this is that sorting devices effectively create a laminar flow that floats up 2D material (to cause the 2D material to land on a particular pathway that is used to further process/sort 2D items), but cease this laminar flow whenever a 3D item is coming across their fire path. This could also be called a "selective laminar flow".

In some embodiments, using one or more sets of air jets to perform the separation of designated category materials from non-designated category materials (e.g., the split of 2D objects from non-2D such as 3D objects) is a unique configuration that enables the separation of 2D (e.g., light objects, primarily fibers, cardboards, and sometimes films) and 3D (e.g., heavier objects, primarily plastics containers, aluminum cans) items with an unprecedented degree of flexibility, efficiency, cost, and size.

Conventionally, multiple screens have been relied on for this process of splitting out materials into these "2D" and "3D" categories, in part due to the sensor challenges of near infrared (NIR) sensors at this scale (e.g., it is harder to get a clear and accurate signal with a belt this busy), and in part due to optical sensors being a newer phenomenon than large industrial screens, with a less diverse range of operations than an artificial intelligence powered by a camera sensor. Various embodiments described herein outperform the efficiencies that are provided by traditional screens while maintaining excellent purity. Even when "overfed" (e.g., when the devices are run above target specifications), the efficiency of AI-based systems coupled to air jet array sorting devices fail gracefully, dropping down to 90% when overfed by as much as 50% of intended mass flow. By contrast, many ballistic separators fail acutely when overfed, dumping all material out onto the "under" section (the intended pathway for 3D objects). Other advantages of this system over screens include lowered cost, lowered maintenance burden (e.g., screens have expensive industrial maintenance processes, and get clogged by films often, leading to per-shift maintenance tasks), and a smaller footprint. In addition, AI-based systems are inherently more flexible, enabling dynamic changes to sorting behavior based on varying operator needs or learnings from the system in operation.

In addition to leveraging the flexible firing width/pressure of jets and AI technology used to discriminate between objects that are of and not of a designated category, this process design incorporates a number of other improvements. These other improvements include load balancing, where the two or more air jet array sorting devices naturally avoid overutilization of individual air jet array sorting devices in the series. For example, the system will monitor (e.g., via vision sensors) the material coming into the sorting facility, and rate limit a jet to avoid firing to a point of degraded performance. Firing too much can degrade the performance of an air jet array sorting device (e.g., can lead to variable air pressure, turbulence in the firing environment, and item collision). Air jet array sorting devices generally can degrade when not maintained (in particular, valves will build up clogs over time). When an air jet array sorting device is not being used, the air jet array sorting device can perform self-maintenance comprising a fire off routine to clear valves. In applying load balancing, it may be better to split the mass flow between the first jet and subsequent jets, enabling each to perform at optimal duty, while ensuring overall separation efficiency, all while balancing mass flow across the separation process, to reduce jams within each air jet array sorting device. In some embodiments, during the load balancing process, the air jet array sorting devices will also prioritize higher value targets to ensure that any loss in efficiency is incurred in such a way that minimizes the impact (e.g., economic) by prioritizing each jet to ensure effective separation on the most valuable items first.

In some embodiments, prior to being fed into a separation of materials sorting process, such as the ones described above in FIGS. 1 through 7, the materials can be prepared using an infeed process that does not require manual pre-sorting. In various embodiments, this infeed process runs the materials through a reducer and then into a fines screen. The reducer comprises a device that shreds materials into small pieces and then the fines screen can filter out fine particles from the material stream. For example, the reducer can reduce items to 12" or less in width. The remaining materials that are not filtered out by the fines screen can lead into the separation process that is described above. By utilizing this specific inflow, human enabled pre-sort and any additional large item screening can be removed from the infeed process entirely, allowing for an ultra-competitive infeed process that enables highly efficient routing of designated category (e.g., 2D) and non-designated category (e.g., 3D) material with unprecedented levels of automation. The separation process can continue to divert residue, which thereby obviates the need to use certain traditional techniques (e.g., cardboard screen, polishing screen, and/or ballistics) at the infeed into the separation process. In some embodiments, this infeed process, like aspects of the separation of materials process, can be programmatically reconfigured or dynamically adapted to changes in material (such as a different infeed feedstock: e.g., reclaimer residue vs. materials recovery facility residue, or single-family single-stream vs. commercial single-stream, or even just wetter material due to rain). This equipment configuration is highly leveraged by the MCS (e.g., a cloud-based control system that receives and sends data throughout a single sorting facility and/or across multiple sorting facilities) and automation capabilities. For example, infeed conveyor belt speeds and reducer settings can be dynamically adjusted (e.g., in response to events) to maximize infeed efficiency and smoothly meter the system. Additionally, the fines screen speed can also be dynamically adjusted to minimize target material loss through the screen while adjusting to ensure a small fraction is efficiently removed from the system, across a variety of infeed types.

In some embodiments, this system can optionally include a pre-sort platform (for particularly challenging streams), and a magnet (for removing ferrous materials) that can be added ahead of a fines screen.

Figure 8:
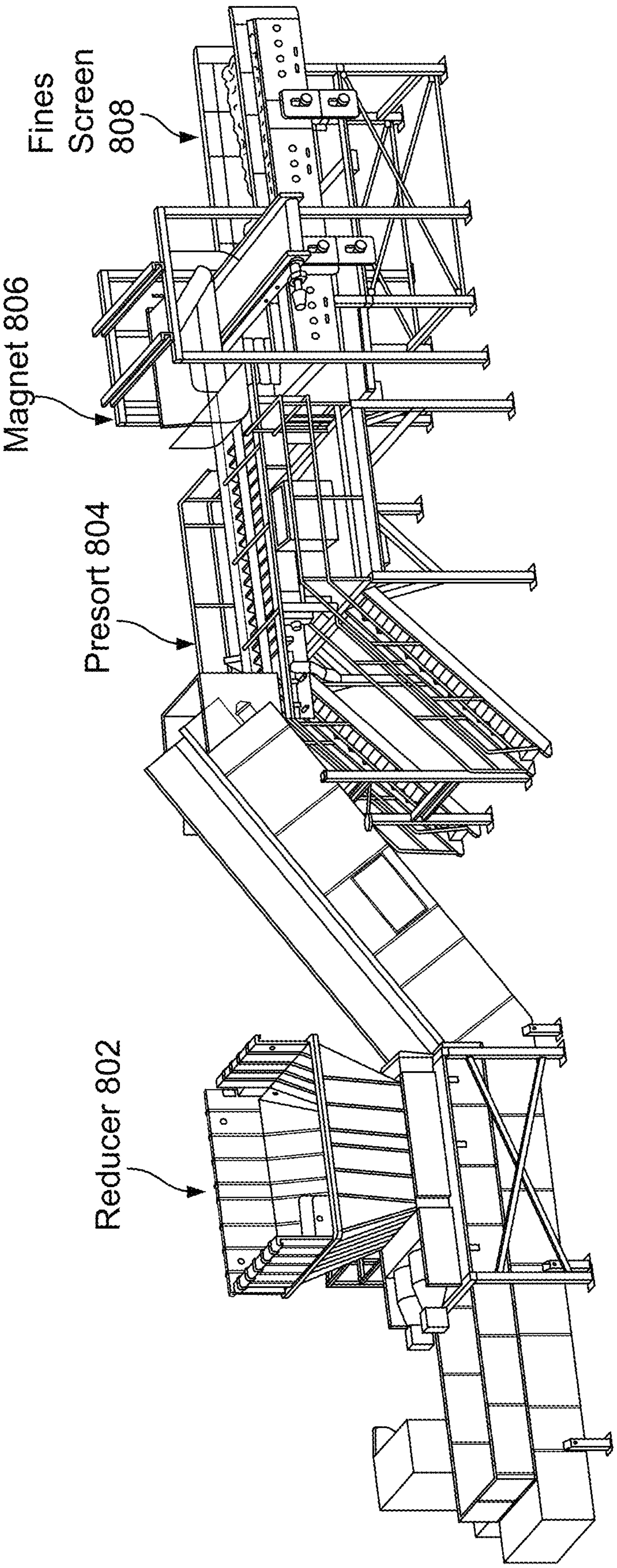
FIG. 8 is a diagram showing an example of a pre-sorting process that can be performed on heterogeneous materials before they are deposited at the infeed to a process for separating objects into those that correspond to a designated category and those that do not correspond to the designated category.

FIG. 8 is a diagram showing an example of a pre-sorting process that can be performed on heterogeneous materials before they are deposited at the infeed to a process for separating objects into those that correspond to a designated category and those that do not correspond to the designated category. As shown in the example of FIG. 8, the material stream is initially conveyed towards reducer 802, which shreds the materials into smaller/reduced pieces. The reduced pieces are then conveyed upwards towards an optional pre-sort platform, presort 804, at which operators can manually remove (e.g., hazardous) items off the conveyor belt. The items that are remaining on the conveyor belt after presort 804 can then be conveyed below magnet 806 that removes ferrous materials. The items that are remaining on the conveyor belt after the magnet are conveyed into fines screen 808 to remove the fines. The items that are remaining on the conveyor belt after fines screen 808 can be fed into a separation of materials process, such as the ones described above in FIGS. 1 through 7.

The combination of at least reducer 802 and fines screen 808 in the infeed process as described herein removes the large footprint/high-cost set of multiple screens (e.g., one for fines, one for large items/OCC, one to two for 2D/3D materials separation) that are traditionally required for a sorting facility, leading to significantly lower capital expenditures and operational expenditures on pre-sort. Also, the dynamic mapping of reducer speed and the movement of the fines screen to automatically optimize material can be used to effectively perform metering into this sorting configuration.

Figure 9:
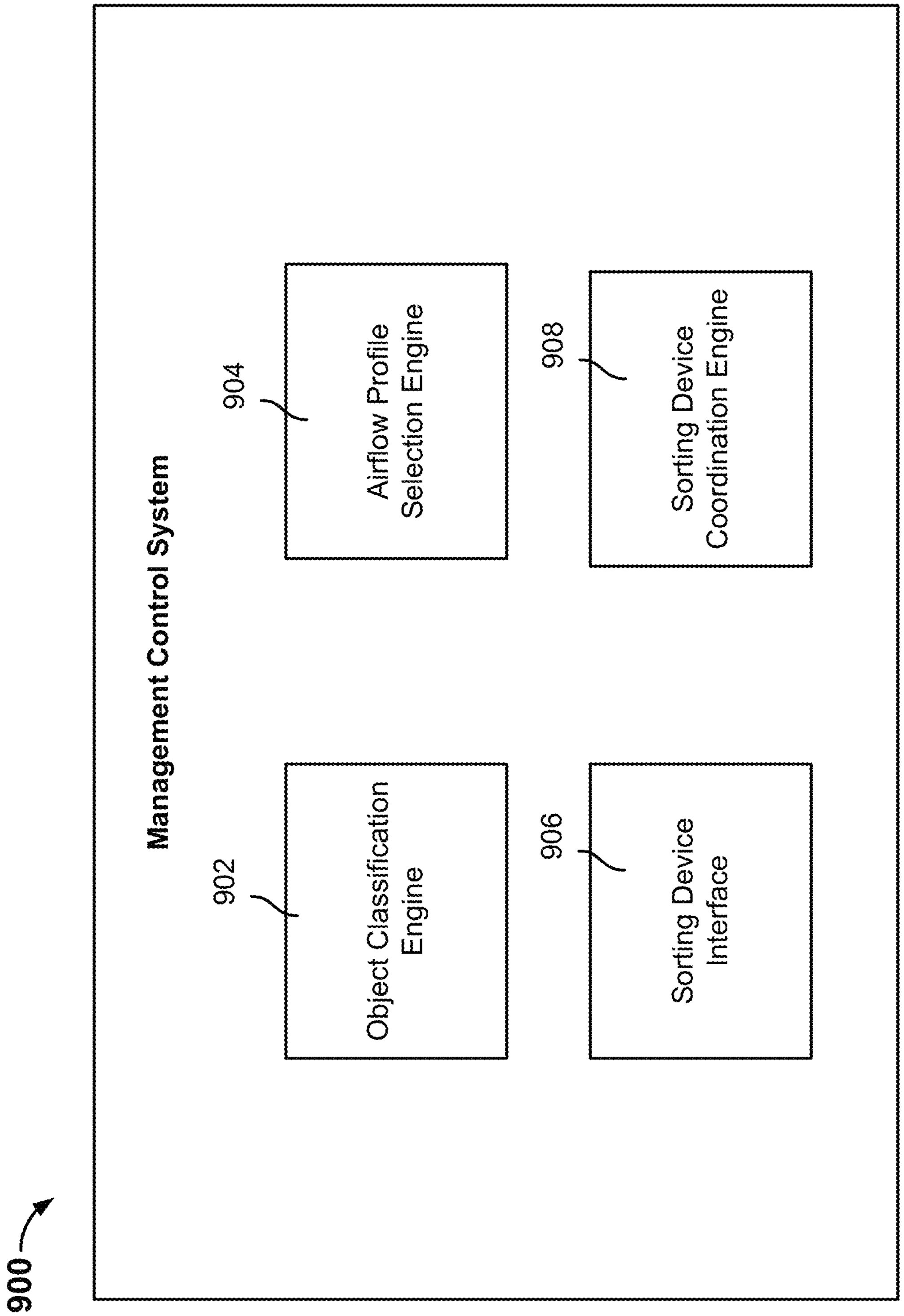
FIG. 9 is a diagram showing an example of a management control system (MCS) in accordance with some embodiments.

FIG. 9 is a diagram showing an example of a management control system (MCS) in accordance with some embodiments. In FIG. 9, the example MCS includes object classification engine 902, airflow profile selection engine 904, sorting device interface 906, and sorting device coordination engine 908. In some embodiments, each of object classification engine 902, airflow profile selection engine 904, sorting device interface 906, and sorting device coordination engine 908 may be implemented using hardware (including one or more processors and/or one or more memories) and/or software. In some embodiments, MCS 202 as described with FIG. 2 may be implemented, at least in part, using the example MCS described in FIG. 9.

Object classification engine 902 is configured to receive images of objects from (e.g., vision and/or hyperspectral) sensors and then apply machine learning to the images to detect the objects and the classifications of the objects. In some embodiments, object classification engine 902 executes one or more of the following types of software: a neural network algorithm, reinforcement learning algorithm, support vector machine, regression (logistic or otherwise), Bayesian inference, and other statistical techniques. In one example, object classification engine 902 is configured to run one or more machine learning models that are configured to identify object(s) within the image received from a vision sensor (e.g., that are placed above a conveyor device). In another example, object classification engine 902 is configured to run one or more machine learning models that are configured to identify object(s) within a combination of signals received from both a vision sensor (e.g., that is placed above a conveyor device) and/or a near infrared sensor (e.g., that is placed on the side of a conveyor device). For example, the machine learning model(s) running at object classification engine 902 are configured to determine the location of (e.g., the outline of) objects and other attributes of the objects in the received image. Object classification engine 902 is configured to compare the determined object attributes (e.g., a material type, a shape, a size, dimensions, a mass, a density, a priority, a condition, a form factor, a color, a polymer, and/or a brand) to a reconfigurable set of target object criteria to determine those object(s) that match the criteria as "target objects" and those object(s) that do not match the criteria as "non-target objects." In various embodiments, the target object criteria specify object attributes that are associated with a designated category. An example of a designated category is "2D objects" and the associated target object criteria can specify certain material types (e.g., plastic film, paper, cardboard, fiber-based) and certain densities. "Target objects" are candidate objects which object classification engine 902 is to instruct a sorting device, which is located downstream from the sensor(s), to perform diverting operations on and to deposit the diverted objects onto a conveyor device that conveys diverted objects to a corresponding bunker or additional designated category related sorting.

Airflow profile selection engine 904 is configured to select an airflow profile corresponding to a target object that is to be fired upon based on the target object's classification (e.g., that was received from object classification engine 902). As mentioned above, an air jet array type of sorting device can execute a time varying air stream to divert a target, designated category object as the object passes over its controllable air stream target region. In some embodiments, airflow profile selection engine 904 is configured to select an airflow profile corresponding to a target object from storage by selecting a stored airflow profile whose associated combination of object attributes most closely matches on the target object's attributes.

In some embodiments, airflow profile selection engine 904 is further configured to predict a start time at which the target object is to pass across the controllable air stream target region of the air jet array sorting device (e.g., in a series of sorting devices positioned along a base sorting line) that is configured to execute the firing polygon of the selected airflow profile on the target object. For example, airflow profile selection engine 904 can estimate this start time based on the detected location of the target object, the known speed of the conveyor device, and a known/calibrated distance between the end of the conveyor device and the controllable air stream target region of the air jet array sorting device. In some embodiments, airflow profile selection engine 904 is further configured to also predict an end time at which the target object is to finish passing across the controllable air stream target region of the air jet array sorting device. For example, airflow profile selection engine 904 can estimate this end time based on the speed of the conveyor device and/or the detected dimensions/shape/size of the target object.

Sorting device interface 906 is configured to send the selected airflow profile, the firing polygon, and the estimated start and/or end times corresponding to a target object (e.g., that were determined by airflow profile selection engine 904) to the air jet array sorting device that is configured to perform the diverting operation on the target object. In some embodiments, sorting device interface 906 is configured to send the airflow profile, the firing polygon, and the estimated start and/or end times with data structures including compatible commands that can be executed by an embedded controller at the sorting device to effectuate the air jet firings as described in the firing polygon. In some other embodiments, sorting device interface 906 is configured to send the airflow profile, the firing polygon, and the estimated start and/or end times to the air jet array sorting device and then the embedded controller at the sorting device locally generates compatible commands to effectuate the air jet firings as described in the firing polygon to reduce the latency associated with receiving such commands over a network.

Sorting device coordination engine 908 is configured to coordinate the performance of diverting actions on a target, designated category objects, and the performance of maintenance routines by a series of two or more sorting devices that are located along a base sorting line within a sorting facility. Given that the series of two or more sorting devices are redundantly capable of diverting the same category of objects (i.e., objects in the designated category) away from the base sorting line, sorting device coordination engine 908 is configured to send data (e.g., comprising control instructions to execute commands associated with a diverting action using a selected airflow profile or comprising a selected airflow profile that the sorting device is configured to determine how to execute) to the sorting devices to ensure desirable load balancing and schedule maintenance routines, for example. In some embodiments, sorting device coordination engine 908 is configured to coordinate activities by the series of two or more sorting devices based on one or more of: receiving performance feedback from the serial sorting devices, tracking the historical firing activities of the serial sorting devices, receiving feedback from quality control components downstream of the serial sorting devices, detecting clogs at the serial sorting devices, and upstream overhead sensor data. In a first example, in response to feedback from a first air jet array sorting device that a section of valves at certain locations (e.g., along the X-direction) across the conveyor belt's width are clogged or otherwise needs maintenance, sorting device coordination engine 908 may instruct a second sorting device that is downstream of the first air jet array sorting device to fire upon target objects whose locations (e.g., on the X-direction) overlap with the clogged section of the first air jet array sorting device because the upstream first air jet array sorting device may not be able to successfully divert those objects. In a second example, after determining that the average historical firing rate (e.g., the number of times that the air valves have fired over a specified period of time such as a minute) of a first sorting device is approaching a configured maximum average firing rate (which if exceeded, could undesirably degrade the performance of the sorting device), sorting device coordination engine 908 may instruct the first air jet array sorting device to target/fire upon fewer target, designated category objects and also instruct a second sorting device that is either upstream or downstream from the first air jet array sorting device to target/fire upon more target, designated category objects so as to load balance between the sorting devices. In a third example, in response to a determination that a first sorting device in the series is to perform a self-maintenance routine (e.g., either because of a detected clog at the first sorting device or because sensor data from an upstream sensor shows that no target objects have been detected for at least a threshold period of time and therefore, the first sorting device will be idle for at least that period), sorting device coordination engine 908 may instruct a second sorting device that is downstream from the first sorting device to fire more aggressively (e.g., target more objects that are approaching it) as the first sorting device performs the self-maintenance routine.

Figure 10:
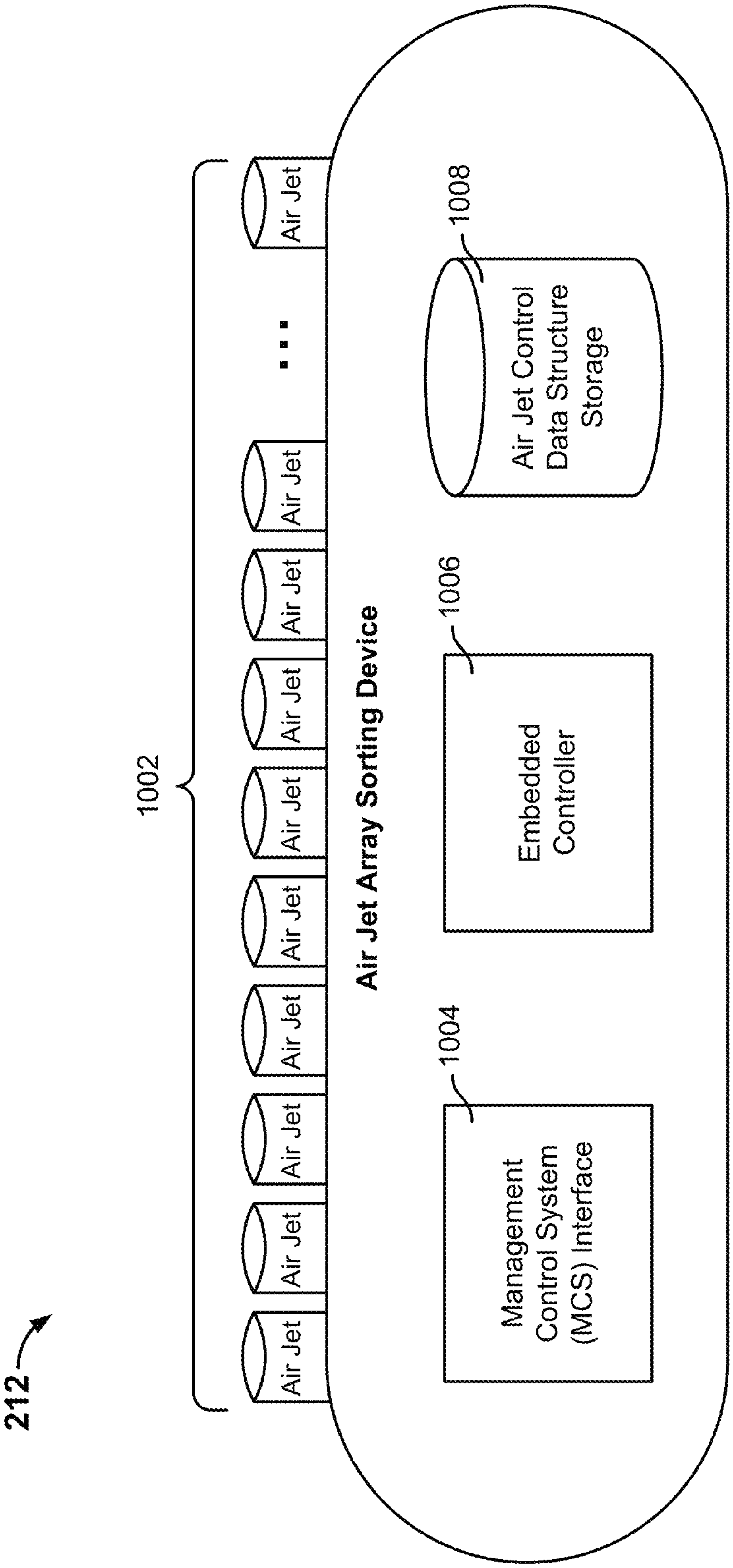
FIG. 10 is a diagram showing an example of an air jet array sorting device in accordance with some embodiments.

FIG. 10 is a diagram showing an example of an air jet array sorting device in accordance with some embodiments. In some embodiments, air jet array sorting device 212 of FIG. 2 may be implemented, at least in part, using the example air jet array sorting device described in FIG. 10. As shown in FIG. 10, the example air jet array sorting device includes air jet array 1002, management control system (MCS) interface 1004, embedded controller 1006, and air jet control data structure storage 1008. Each of management control system (MCS) interface 1004, embedded controller 1006, and air jet control data structure storage 1008 may be implemented using hardware and/or software.

Each air jet of air jet array 1002 is an air valve/nozzle ("air jet") that is coupled to a pressurized air source (not shown). For example, air jet array 1002 may include 83 air jets. Each air jet of air jet array 1002 may be independently controlled by embedded controller 1006, as will be described below, to emit positive airflow (e.g., at either a fixed pressure or a variable pressure) at a certain point in time. Put another way, at a given point in time, a given subset of contiguous or non-contiguous air jets in air jet array 1002 can be activated via jet commands from embedded controller 1006 to fire positive airflow and where the air pressure and firing duration that is emitted by each fired air jet can be controlled by embedded controller 1006.

MCS 1004 is configured to receive control signals/instructions from an MCS (e.g., such as MCS 202 of FIG. 2 or the example MCS described in FIG. 9). In some embodiments, the control signals/instructions that are received from the MCS include control signals/instructions related to performing a sorting operation on a target object that is to translate across the controllable air stream target region of the air jet array sorting device. In some embodiments, such control signals/instructions include data that includes the selected airflow profile, the firing polygon, and the estimated start and/or end times corresponding to a target object. In some embodiments, such control signals/instructions also include (e.g., a time-series of) air jet commands that are specific/compatible with the recipient's particular air jet array sorting device.

Embedded controller 1006 is configured to activate the air jets of air jet array 1002 to perform a sorting operation on a target object based on control signals/instructions received from the MCS that are received at MCS interface 1004. In some embodiments, embedded controller 1006 may be implemented by one or more controllers. Embedded controller 1006 may run an embedded operating system (e.g., embedded Linux, or other real-time operating system), or may not require a traditional operating system. In response to receiving control signals from the MCS via a network (e.g., WiFi, Ethernet), embedded controller 1006 is configured to generate the instructions necessary to control air jet array 1002 or other proprietary devices in the system (e.g., an actuator). In some embodiments, the controller software implements one or more wireline or wireless protocols that are compatible with the controlled devices (e.g., the air jet array). In some embodiments, the control signals received from the MCS may already include a data structure that includes a time series of air jet commands for embedded controller 1006 to execute to perform the firing polygon of an instructed sorting operation. When the MCS originated control signals include jet commands, latency may be introduced in sending more data from the MCS over a network to the air jet array sorting device but embedded controller 1006 may require fewer computing resources by not needing to locally generate such jet commands. In some other embodiments, the control signals received from the MCS do not already include a data structure that includes a time series of air jet commands for embedded controller 1006 to execute and instead, embedded controller 1006 processes the received input control signals (e.g. instructions from the MCS) and then references internal data structure(s) stored at air jet control data structure storage 1008 that are specific to the control of air jets of air jet array 1002, and uses the control signals and located internal data structure(s) to generate commands compatible with the target device to effectuate the desired actions. For example, the MCS may generate a signal to the embedded controller specifying activation of pressure profiles for 4 of 83 jets within air jet array 1002 across a time series. The pressure profiles may be stored internally at air jet control data structure storage 1008, and embedded controller 1006 generates a time varying control sequence of commands to the applicable air jets in air jet array 1002 resulting in a time-based varying pressure being created at the target air jets. When internal data structures including jet commands that are configured to execute airflow profiles are already locally stored at the air jet array sorting device in air jet control data structure storage 1008, the MCS only needs to specify a selected airflow profile, the firing polygon, and a predicted (e.g., actuation) start time in its control signals to embedded controller 1006. In some embodiments, the MCS generates control signals ahead of time (e.g., before a target object is within range of the controllable air stream target region of the air jet array sorting device), and sends the control signals to embedded controller 1006 along with a start time based upon the estimated object trajectory. In this way, latencies introduced by sending a larger control signal payload between the MCS and embedded controller 1006 are eliminated from consideration, allowing the control signals to focus on the exact parameters needed for air jet actuation. This pre-planning also allows the air jet array sorting device to utilize the latency saved by "pre-planned" firing to further optimize its firing pattern against physical actuation limitations caused by the pulsewidth of the actuation signal or physical characteristics of the valve. Regardless of where the jet commands corresponding to a firing polygon are generated, embedded controller 1006 is configured to use the jet commands to cause the specified subset of air jets to start activating (e.g., to start emit positive airflow at a specified pressure and/or for a specified duration) at each point in time that is prescribed by the firing polygon over the duration prescribed by the firing polygon to effectuate a 2D airstream.

Figure 11:
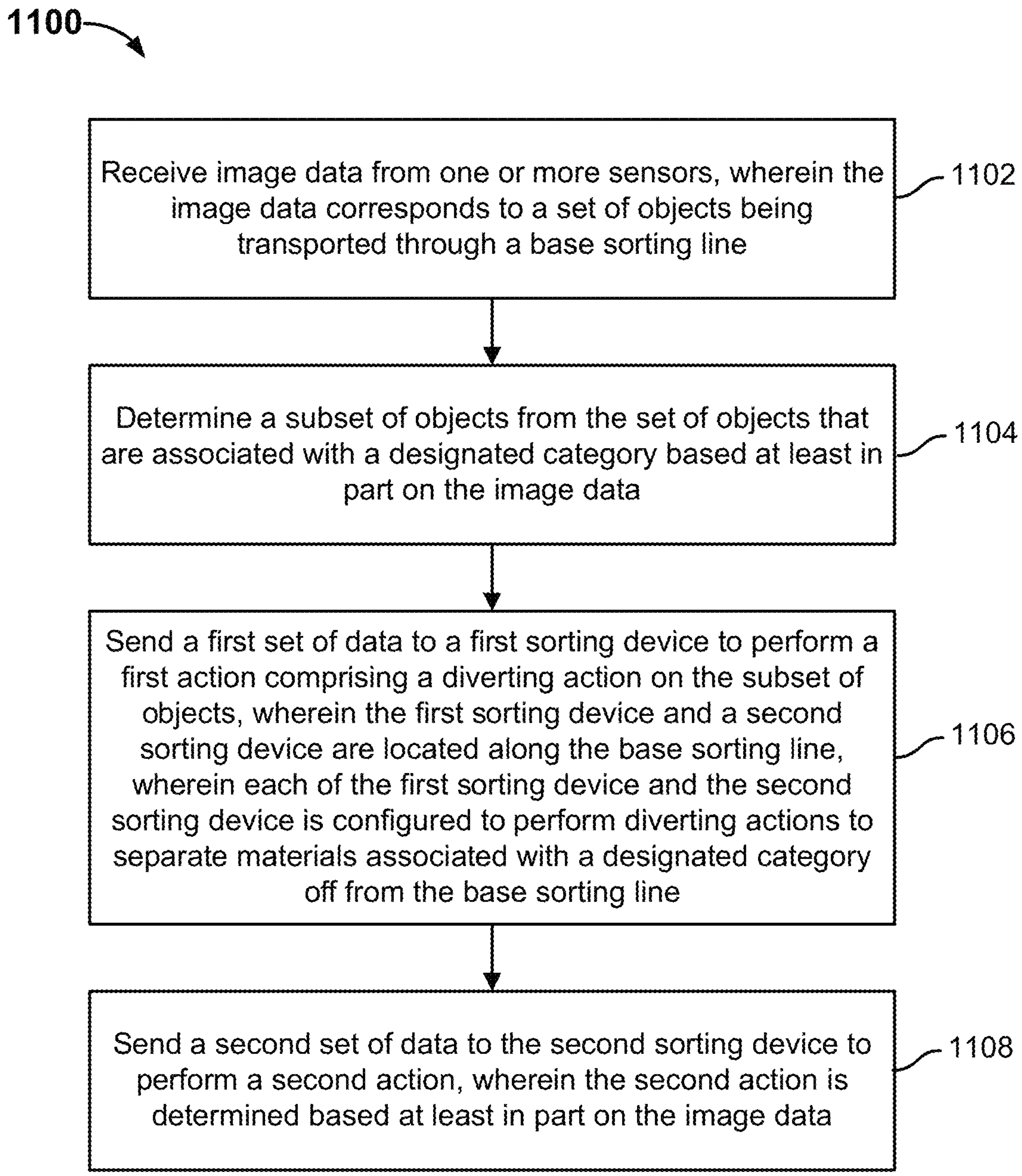
FIG. 11 is a flow diagram showing an embodiment of a process for separation of materials using coordinated sorting devices.

FIG. 11 is a flow diagram showing an embodiment of a process for separation of materials using coordinated sorting devices. In some embodiments, process 1100 may be implemented, at least in part, on an MCS such as the example MCS described in FIG. 9.

At 1102, image data is received from one or more sensors, wherein the image data corresponds to a set of objects being transported through base sorting line. In some embodiments, the image data comprises one or more images that are captured by one or more vision sensors (e.g., cameras) that are positioned above one or more conveyor devices that are conveying a heterogeneous mix of objects along a base sorting line within a sorting facility. In some embodiments, sensor data on the objects other than image data, including from near infrared sensors, are also received. For example, the infrared sensor(s) can be placed on the side(s) of the series of conveyor devices that form the base sorting line.

At 1104, a subset of objects from the set of objects that are associated with a designated category is determined based at least in part on the image data. Machine learning models that are trained to recognize the presence, location, and/or attributes of the objects within the sensor data are used to analyzed the received sensor data. For example, if the sensor data comprises a combination of image data and near infrared signals on the objects, then models that have been trained on the fusion of signals from different sensor types can be used to evaluate the sensor data. In another example, if the sensor data comprises just image data, then models that have been trained on only image data can be used to evaluate the sensor data. In some embodiments, a "classification" of an object includes a set of attributes associated with an object (e.g., a material type, a location, a shape, a size, dimensions, a mass, a density, a priority, a condition, a form factor, a color, a polymer, and/or a brand). The classification of each object is compared to a set of target object criteria, which describes the attributes of objects in a designated category to determine which objects belong to the designated category and are therefore target objects.

At 1106, a first set of data is sent to a first sorting device to perform a first action comprising diverting action on the subset of objects, wherein the first sorting device and a second sorting device are located along the base sorting line, wherein each of the first sorting device and the second sorting device is configured to perform diverting actions to separate materials associated with a designated category off from the base sorting line. While objects that are determined to belong to the designated category are target objects that are candidates to be diverted from the base sorting line, which target objects are actually to be fired upon by which sorting device that is in a series of sorting devices that are positioned along the base sorting line is determined in a manner that takes into account the historical firing behavior, feedback from the sorting devices, and/or current maintenance needs of the sorting devices. Put another way, in various embodiments, the firing behavior of the two or more sorting devices in the series is determined in a coordinated manner. As such, a set of data related to identified target objects that is sent to a first sorting device in the series may influence the determination of another set of data that is sent to a second sorting device in the series so that the actions performed by the series of sorting devices are coordinated. In some embodiments, the set of data that is sent to a sorting device comprises a control instruction to instruct the sorting device to perform a first action that is a diverting action (and how to do so, using a selected airflow profile, for example) on a first target object. In some embodiments, the set of data that is sent to a sorting device comprises data (a selected airflow profile, for example) that the sorting device can use to locally determine when and how to perform the diverting action on the first target object.

At 1108, a second set of data is sent to the second sorting device to perform a second action, wherein the coordination action is determined based at least in part on the image data. In some embodiments, the second action is also a diverting action to be performed on a different, second target object. In some embodiments, the second action is a coordinated action that is determined relative to the first set of data that was sent to the first sorting device. Examples of a coordinated action that a second sorting device, which could be positioned downstream or upstream from the first sorting device along the base sorting line, is to perform in light of the diverting action(s) to be performed by the first sorting device include, for example, to fire on more or fewer target objects (e.g., by increasing or lowering its firing rate) as compared to the first sorting device, to fire on target objects with different attributes than those targeted by the first sorting device, to perform a self-maintenance routine given that the first sorting device is firing on target objects, and to fire on target objects located at different locations along the width of a conveyor belt than the target objects that are targeted by the first sorting device.

Figure 12:
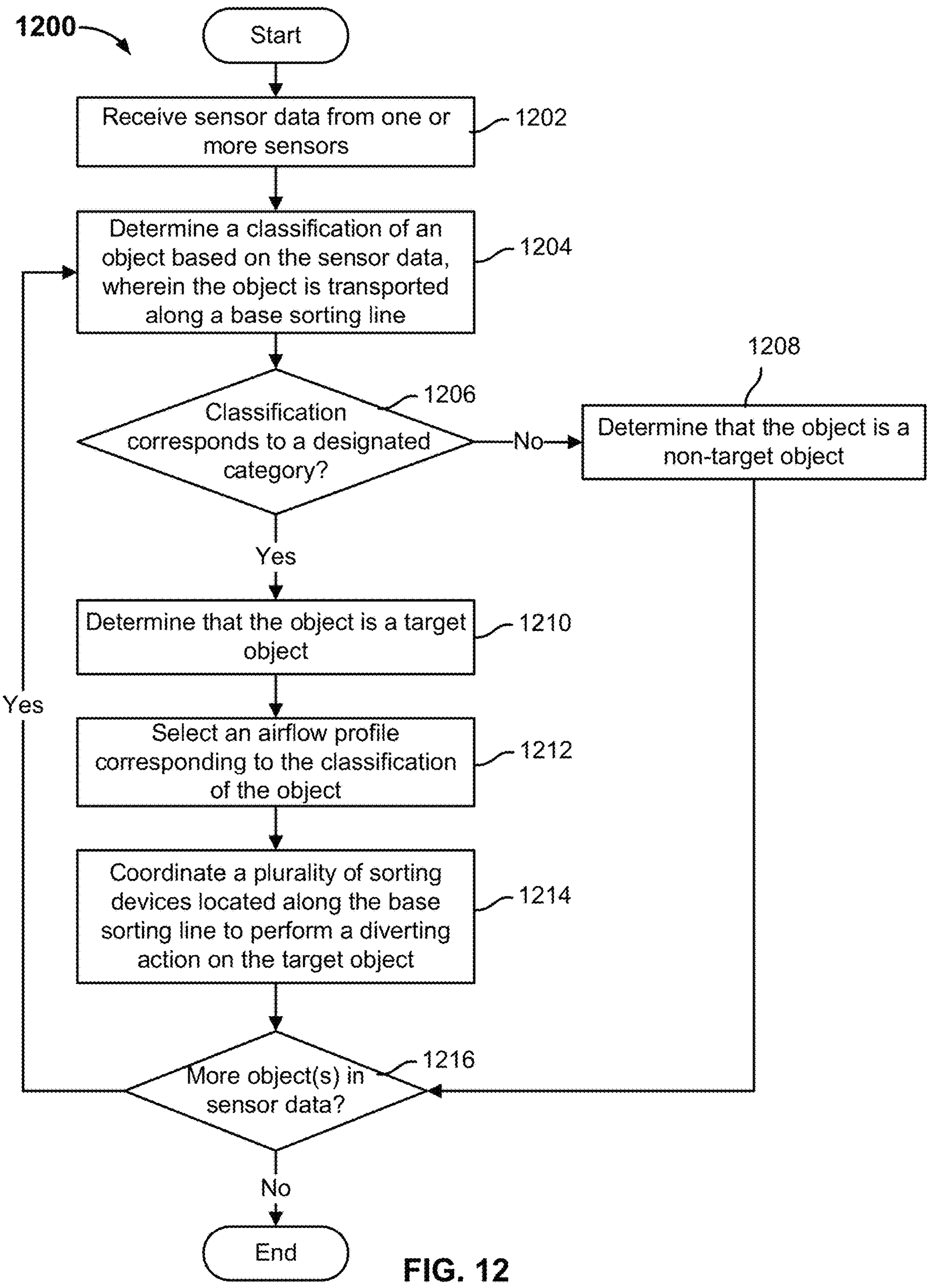
FIG. 12 is a flow diagram showing an example of a process for determining an airflow profile corresponding to a target object in accordance with some embodiments.

FIG. 12 is a flow diagram showing an example of a process for determining an airflow profile corresponding to a target object in accordance with some embodiments. In some embodiments, process 1200 may be implemented, at least in part, on an MCS such as the example MCS described in FIG. 9. In some embodiments, process 1100 of FIG. 11 be implemented, at least in part, using process 1200. In the example of process 1200, the serial sorting devices along the base sorting line are air jet array sorting devices.

At 1202, sensor data is received from one or more sensors. Examples of the types of sensors that can capture data on objects being transported along a base sorting line include vision sensors and/or hyperspectral sensors.

At 1204, a classification of an object is determined based on the sensor data, wherein the object is transported along a base sorting line. The "classification" of an object that appears within the sensor data includes a set of attributes associated with an object (e.g., a material type, a location, a shape, a size, dimensions, a mass, a density, a priority, a condition, a form factor, a color, a polymer, aerodynamic attributes, and/or a brand).

At 1206, whether the classification of the object corresponds to a designated category is determined. In the event that the classification of the object corresponds to the designated category, control is transferred to 1210. Otherwise, in the event that the classification of the object does not correspond to the designated category, control is transferred to 1208. The object's classification is compared to a set of target object criteria, which includes conditions for when an object belongs to a designated category. For example, if the designated category were 2D objects, then the set of target object criteria may specify that objects of a certain density and/or one or more specified material types (e.g., plastic film, fiber, paper, cardboard) are 2D objects.

At 1208, it is determined that the object is a non-target object. An object that matches the designated category is a target object and therefore a candidate object that a sorting device is to divert away from the base sorting line.

At 1210, it is determined that the object is a target object. An object that matches the designated category is not a target object and therefore not a candidate object that a sorting device is to divert away from the base sorting line.

At 1212, an airflow profile corresponding to the classification of the object is selected. An airflow profile that matches at least some of the attributes (e.g., object type, material type, aerodynamic attributes) described in the classification of the object is selected and where the airflow profile prescribes a firing polygon to be executed by an air jet array sorting device onto that target object as the target object passes over its air jet array. The firing polygon of the selected airflow profile is designed to increase the probability that the target object will be successfully diverted to a desired location.

At 1214, a plurality of sorting devices located along the base sorting line is coordinated to perform a diverting action on the target object. The series of two or more air jet array sorting devices are instructed to fire on the target object or avoid firing on the target object in a way that load balances firing rates or the mass of objects to target among the coordinated sorting devices, schedules appropriate sorting device maintenance routines, and optimizes selective firings from different sections among different air jet arrays.

At 1216, whether at least one more object is detected in the sensor data is determined. In the event at least one more object is detected in the sensor data, control is returned to 1204. Otherwise, in the event that there are no more objects in the sensor data, process 1200 ends.

Figure 13:
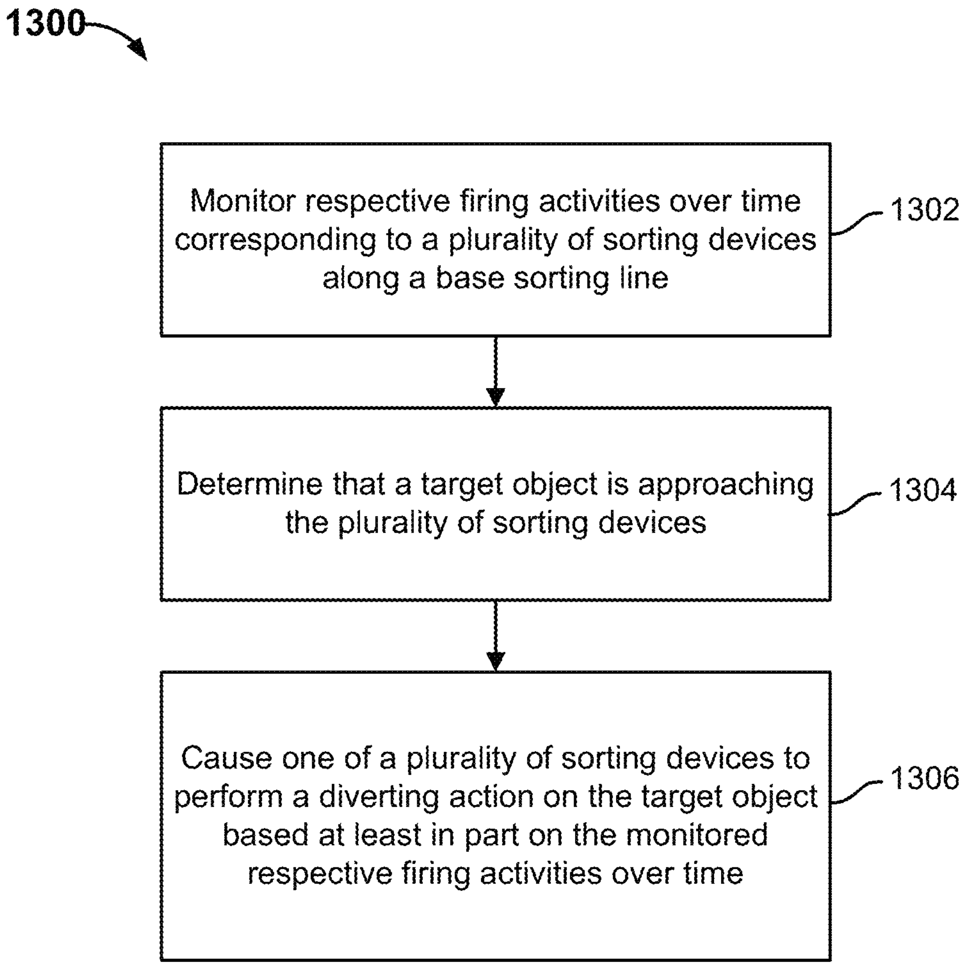
FIG. 13 is a flow diagram showing an example of a process for load balancing the utilization of serial sorting devices in accordance with some embodiments.

FIG. 13 is a flow diagram showing an example of a process for load balancing the utilization of serial sorting devices in accordance with some embodiments. In some embodiments, process 1300 may be implemented, at least in part, on an MCS such as the example MCS described in FIG. 9. In some embodiments, step 1214 of process 1200 of FIG. 12 may be implemented, at least in part, using process 1300.

At 1302, respective firing activities over time corresponding to a plurality of sorting devices along a base sorting line are monitored. In some embodiments, each air jet array sorting device is configured to record or otherwise track the number of times that each of its air valves or any of its air valves are firing (e.g., activated to shoot positive airflow). In some embodiments, the MCS is configured to record or otherwise provide feedback on the number of times that each air valve or any of the air valves of a particular air jet array sorting device fires (e.g., activated to shoot positive airflow) in diverting an object. In some embodiments, a current utilization metric can be determined for each sorting device based on such monitored firing activities. For example, an average firing rate (e.g., the number of firing attempts per minute) can be computed for each sorting device based on the monitored firing activities.

At 1304, it is determined a target object is approaching the plurality of sorting devices. A target object that is upstream of the sorting devices along the base sorting line can be detected from sensor data.

At 1306, one of a plurality of sorting devices is caused to perform a diverting action on the target object based at least in part on the monitored respective firing activities over time. In some embodiments, the utilization metric of each sorting device is used to load balance each sorting device's future utilization metric. Load balancing the utilization among sorting devices serves the purpose of avoiding having any sorting devices firing to the point of degraded performance, which can lead to undesirable consequences such as: variable air pressure, turbulence in the firing environment, and item collision. Load balancing each sorting device's future utilization metric may involve limiting one or more sorting devices' firing rates to certain target rates and/or prescribing conditions for when certain sorting devices should fire on a target object to enforce such target firing rates. Load balancing each sorting device's future utilization metric may also involve instructing a first sorting device that has a relatively lower current utilization metric to fire more often (to achieve a lowered target utilization metric) and/or instructing a second sorting device to fire less often (to achieve a higher target utilization metric). In a first example, if a utilization metric of a sorting is approaching a predetermined target utilization metric (e.g., a predetermined firing rate), then the sorting device is instructed to only execute diverting actions on target objects for which the machine learning models predict that the sorting device has a higher than threshold probability of successfully diverting. In a second example, if a utilization metric of a sorting is approaching a predetermined target utilization metric (e.g., a predetermined firing rate), then the sorting device is instructed to only execute diverting actions on target objects for which a determined priority (e.g., economic value) is higher than a threshold value. Put another way, load balancing utilization of the serial sorting devices can prevent overutilization of any one sorting device while also ensuring that any loss in efficiency is occurred in such a way that minimizes the impact (e.g., economic) by prioritizing target objects that are more likely to be successfully diverted and/or have greater value.

Figure 14:
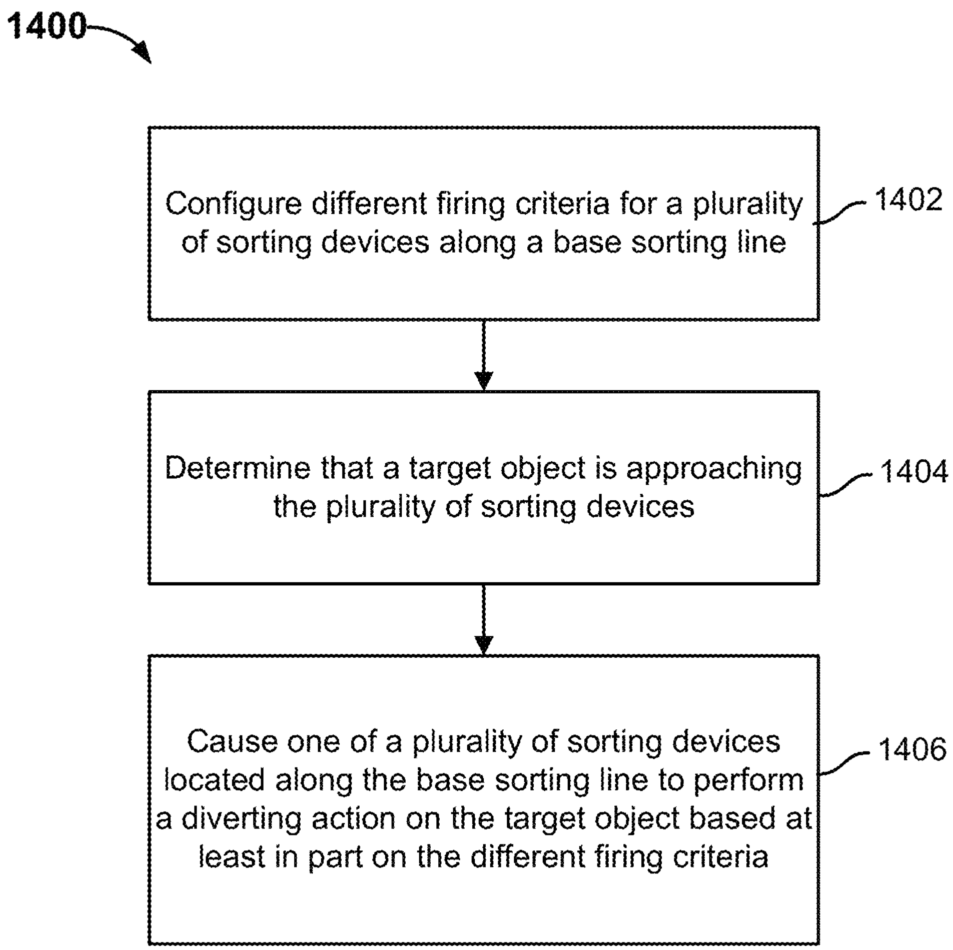
FIG. 14 is a flow diagram showing an example of a process for dividing the types of target objects to fire on among serial sorting devices in accordance with some embodiments.

FIG. 14 is a flow diagram showing an example of a process for dividing the types of target objects to fire on among serial sorting devices in accordance with some embodiments. In some embodiments, process 1400 may be implemented, at least in part, on an MCS such as the example MCS described in FIG. 9. In some embodiments, step 1214 of process 1200 of FIG. 12 may be implemented, at least in part, using process 1400.

At 1402, different firing criteria is configured for a plurality of sorting devices along a base sorting line. While a target object is one that belongs to a designated category, there are objects with different attributes (e.g., object types, material types) that correspond to the designated category. As such, another way to load balance the diversion of target objects among the series of sorting devices is to associate/configure subcategories of objects within the designated category to be fired on by different sorting devices. Put another way, different sorting devices in the series may be configured with different firing criteria that describe the attributes of subcategories of objects that belong to the designated category upon which each sorting device is to fire. In a first example, if the designated category were 2D objects, then a first sorting device can be configured to fire on target objects with the material type of paper and a second sorting device can be configured to fire on target objects with the material type of plastic film. In a second example, if the designated category were 2D objects, then a first sorting device can be configured to fire on target objects with centroids located along a first segment of the conveyor belt width (e.g., along the X-direction) and a second sorting device can be configured to fire on target objects with centroids located along a second segment of the conveyor belt width (e.g., along the X-direction).

At 1404, it is determined a target object is approaching the plurality of sorting devices. A target object that is upstream of the sorting devices along the base sorting line can be detected from sensor data.

At 1406, one of a plurality of sorting devices is caused to perform a diverting action on the target object based at least in part on the different firing criteria. Target objects may be divided among the series of sorting devices based on their respective attributes and/or locations along the width (e.g., in the X-direction) of the conveyor belt.

Figure 15:
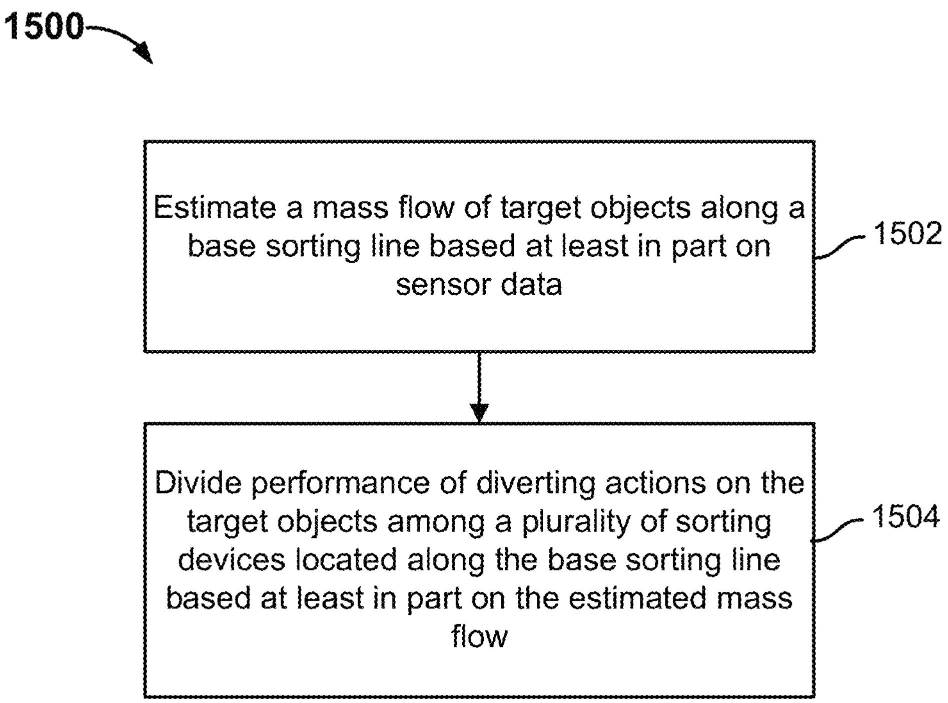
FIG. 15 is a flow diagram showing an example of a process for dividing the performance of diverting actions on target objects among serial sorting devices based on estimated mass flow in accordance with some embodiments.

FIG. 15 is a flow diagram showing an example of a process for dividing the performance of diverting actions on target objects among serial sorting devices based on estimated mass flow in accordance with some embodiments. In some embodiments, process 1500 may be implemented, at least in part, on an MCS such as the example MCS described in FIG. 9. In some embodiments, step 1214 of process 1200 of FIG. 12 may be implemented, at least in part, using process 1500.

At 1502, a mass flow of target objects along a base sorting line is estimated based at least in part on sensor data. The mass flow of target objects can be estimated for example based on counting the number of target objects that are detected within sensor data across time. The mass flow represents a load of target objects that needs to be diverted from the material stream being transported along the base sorting line.

At 1504, performance of diverting actions on the target objects is divided among a plurality of sorting devices located along the base sorting line based at least in part on the estimated mass flow. The performance of diverting actions on the target objects can be load balanced among the series of sorting devices by assigning each sorting device to fire upon a corresponding portion of the estimated mass flow of target objects. In one example, the estimated mass flow is split equally among the first sorting device and each of its downstream sorting devices, enabling each sorting device to perform at optimal duty, while ensuring overall separation efficiency, all while balancing mass flow across the separation process, to reduce jams within each sorting device.

Figure 16:
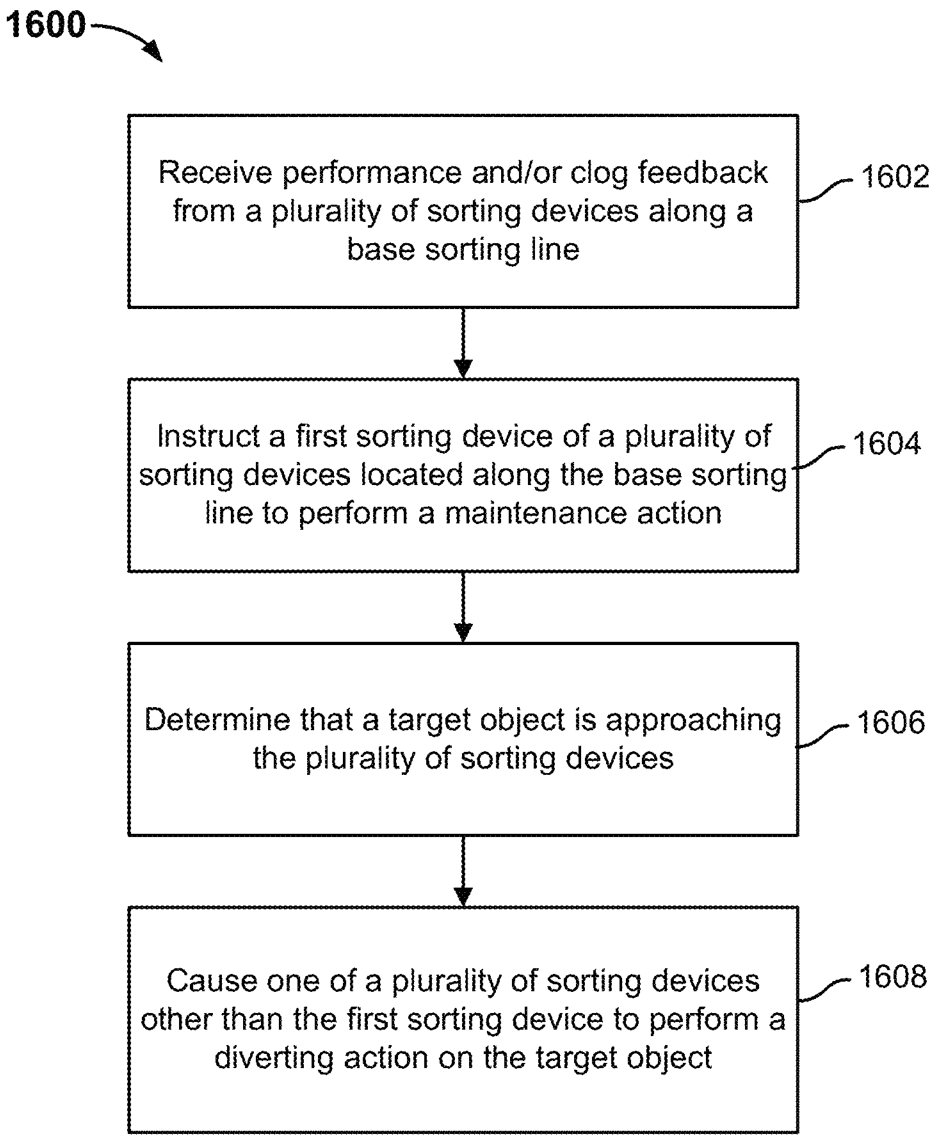
FIG. 16 is a flow diagram showing an example of a process for scheduling maintenance among serial sorting devices based on sorting device feedback in accordance with some embodiments.

FIG. 16 is a flow diagram showing an example of a process for scheduling maintenance among serial sorting devices based on sorting device feedback in accordance with some embodiments. In some embodiments, process 1600 may be implemented, at least in part, on an MCS such as the example MCS described in FIG. 9. In some embodiments, step 1214 of process 1200 of FIG. 12 may be implemented, at least in part, using process 1600.

At 1602, performance and/or clog-related feedback is received from a plurality of sorting devices along a base sorting line. In some embodiments, each sorting device records and/or otherwise provides feedback on their performance or clog status. For example, the air valves in an air jet array sorting device may become clogged over time (e.g., due to debris from the object becoming lodged in the valves), which will undesirably increase the pressure on the airflow that is emitted from the air valves or block air from being emitted by the air valves altogether. As such, sorting devices can provide feedback on the detected pressure of airflows emitted by their air valves and/or detected jams/clogs at one or more air valves.

At 1604, a first sorting device of sorting devices located along the base sorting line is instructed to perform a maintenance action. Feedback that indicates anomalous behavior (e.g., greater than expected air pressure and/or the presence of a clogged air valve) from a sorting device can trigger an instruction for that sorting device to perform a self-maintenance routine. For example, a self-maintenance routine may include the sorting device performing a preconfigured fire off routine to clear the air valves. However, while the sorting device is performing a self-maintenance routine over an expected time period, it will temporarily not be able to perform regular diverting actions on target objects.

At 1606, it is determined that a target object is approaching the plurality of sorting devices. A target object that is upstream of the sorting devices along the base sorting line can be detected from sensor data.

At 1608, one of a plurality of sorting devices other than the first sorting device is caused to perform a diverting action on the target object. Given that a sorting device in the series is scheduled to run a maintenance routine and unable to sort target objects for an expected time period, the performance of diverting actions on the target objects can be load balanced among the remaining sorting devices in the series during that expected time.

Figure 17:
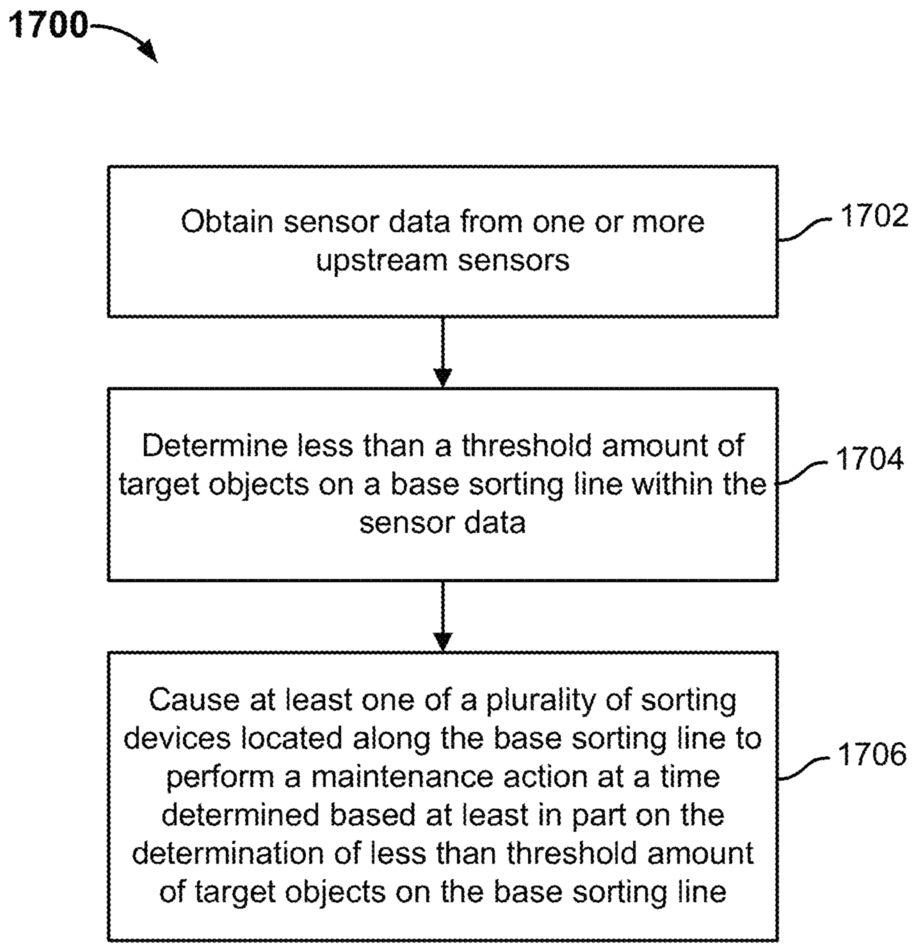
FIG. 17 is a flow diagram showing an example of a process for scheduling maintenance among serial sorting devices based on upstream sensor data in accordance with some embodiments.

FIG. 17 is a flow diagram showing an example of a process for scheduling maintenance among serial sorting devices based on upstream sensor data in accordance with some embodiments. In some embodiments, process 1700 may be implemented, at least in part, on an MCS such as the example MCS described in FIG. 9. In some embodiments, step 1214 of process 1200 of FIG. 12 may be implemented, at least in part, using process 1700.

At 1702, sensor data is obtained from one or more upstream sensors. Sensor data that captures an image of a surface of a conveyor device is obtained from sensors that are upstream to a series of sorting devices located along a base sorting line.

At 1704, less than a threshold amount of target objects on a base sorting line is determined within the sensor data. If a lower than a threshold amount of target objects is detected within the sensor data, then it is anticipated that fewer sorting devices need to be firing at target objects around the time that the portion of the conveyor belt that is captured in the sensor data approaches the sorting devices. Therefore, instead of letting at least some of the sorting devices idle, at least one sorting device in the series can be instructed to opportunistically perform a self-maintenance routine because it is expected that temporarily taking those sorting device(s) offline will not negatively impact the desired separation of materials.

At 1706, at least one a plurality of sorting devices located along the base sorting line is caused to perform a maintenance action at a time determined based at least in part on the determination of less than threshold amount of target objects on the base sorting line. For example, the sorting device(s) that are selected to perform the self-maintenance routine can be instructed to perform such maintenance at respective one or more times during which the portion of the conveyor device that is sensed to have few, if any, target objects is approaching those sorting devices. While the selected sorting device(s) are engaged in maintenance, the performance of diverting actions on any detected target objects can be load balanced among the remaining sorting devices in the series during that time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting system, comprising:

one or more sensors configured to capture image data corresponding to a set of objects being transported through a base sorting line;

a first sorting device and a second sorting device located along the base sorting line, wherein each of the first sorting device and the second sorting device is configured to perform diverting actions to separate materials associated with a designated category off from the base sorting line; and one or more processors configured to:

monitor respective firing activities over time corresponding to the first sorting device and the second sorting device;

receive the image data from the one or more sensors;

determine a subset of objects from the set of objects that are associated with the designated category based at least in part on the image data;

send a first set of data to the first sorting device to perform a first action comprising a diverting action on the subset of objects;

determine a coordinated action relative to the first action to be performed by the second sorting device based on the monitored respective firing activities over time; and send a second set of data to the second sorting device to perform a second action, wherein the second action is determined based at least in part on the image data, wherein the second action comprises the coordinated action.

2. The sorting system of claim 1, wherein the materials associated with the designated category comprise objects of one or more of the following material types: paper, cardboard, or any fiber-based material.

3. The sorting system of claim 1, wherein the diverting action comprises a first diverting action on a first target object within the subset of objects, and wherein the second action comprises a second diverting action on a second target object within the subset of objects.

4. The sorting system of claim 1, further comprising:

a conveyor device on which a first diverted object removed from the base sorting line by the first sorting device or the second sorting device is deposited;

a quality control sensor configured to capture image data of the first diverted object; and wherein the one or more processors are further configured to:

determine that the first diverted object is associated with the designated category based at least in part on the image data of the first diverted object; and send a third set of data to a third sorting device associated with quality control to perform positive sorting by diverting the first diverted object onto a pathway associated with objects that match the designated category.

5. The sorting system of claim 1, further comprising:

a conveyor device on which a first diverted object removed from the base sorting line by the first sorting device or the second sorting device is deposited; and a quality control sensor configured to capture image data of the first diverted object;

wherein the one or more processors are further configured to:

determine that the first diverted object is not associated with the designated category based at least in part on the image data of the first diverted object; and send a third set of data to a third sorting device associated with quality control to perform negative sorting by diverting the first diverted object onto a pathway associated with objects that do not match the designated category.

6. The sorting system of claim 1, wherein the first sorting device is configured to perform the diverting action by shooting air to push on a target object as the target object falls off of a conveyor device in the base sorting line.

7. The sorting system of claim 1, wherein the one or more sensors comprise a vision sensor.

8. The sorting system of claim 1, wherein the one or more sensors comprise a near infrared sensor.

9. The sorting system of claim 1, wherein the base sorting line comprises a series of one or more conveyor devices.

10. The sorting system of claim 1, wherein the one or more processors are further configured to:

determine a classification that corresponds to an object based at least in part on the image data; and determine that the object corresponds to the designated category based at least in part on the classification.

11. The sorting system of claim 10, wherein the one or more processors are further configured to:

select an airflow profile corresponding to the classification of the object, wherein the airflow profile comprises a firing polygon.

12. The sorting system of claim 11, wherein the first sorting device comprises an air jet array sorting device, and wherein the first set of data comprises a control instruction including commands that are to be executed at the air jet array sorting device to effectuate air jet firings described in the firing polygon.

13. The sorting system of claim 11, wherein the first sorting device comprises an air jet array sorting device, and wherein the first set of data sent to the first sorting device comprises data describing the firing polygon that is to be used by the first sorting device to locally generate commands to effectuate air jet firings described in the firing polygon.

14. The sorting system of claim 1, wherein the coordinated action comprises a target utilization metric corresponding to the second sorting device.

15. The sorting system of claim 14, wherein the target utilization metric comprises a target firing rate.

16. The sorting system of claim 1, wherein the one or more processors are further configured to:

configure different firing criteria for the first sorting device and the second sorting device; and determine the coordinated action based at least in part on the different firing criteria.

17. The sorting system of claim 16, wherein the different firing criteria comprises a first firing criteria comprising a first set of object attributes to be targeted by the first sorting device and a second set of object attributes to be targeted by the second sorting device, wherein the first set of object attributes is different from the second set of object attributes.

18. The sorting system of claim 16, wherein the different firing criteria comprises a first firing criteria that describes a first segment along a conveyor belt width to be targeted by the first sorting device and a second segment along the conveyor belt width to be targeted by the second sorting device, wherein the first segment is different from the second segment.

19. The sorting system of claim 1, wherein the one or more processors are further configured to:

estimate a mass flow of the subset of objects along the base sorting line; and determine the coordinated action based at least in part on the estimated mass flow.

20. The sorting system of claim 1, wherein the one or more processors are further configured to:

receive clog-related feedback from the second sorting device; and determine the coordinated action based at least in part on the clog-related feedback.

21. The sorting system of claim 20, wherein the coordinated action comprises to perform a self-maintenance routine.

22. The sorting system of claim 1, wherein the one or more processors are further configured to:

determine less than a threshold amount of target objects on the base sorting line based on the image data; and determine the coordinated action based at least in part on the determination of less than the threshold amount of target objects on the base sorting line.

23. The sorting system of claim 22, wherein the coordinated action comprises to perform a self-maintenance routine.

24. A method, comprising:

receiving image data from one or more sensors, wherein the image data corresponds to a set of objects being transported through a base sorting line;

determining a subset of objects from the set of objects that are associated with a designated category based at least in part on the image data;

monitoring respective firing activities over time corresponding to a first sorting device and a second sorting device, wherein the first sorting device and the second sorting device are located along the base sorting line, wherein each of the first sorting device and the second sorting device is configured to perform diverting actions to separate materials associated with the designated category off from the base sorting line;

sending a first set of data to the first sorting device to perform a first action comprising a diverting action on the subset of objects;

determining a coordinated action relative to the first action to be performed by the second sorting device based on the monitored respective firing activities over time; and sending a second set of data to the second sorting device to perform a second action, wherein the second action is determined based at least in part on the image data, wherein the second action comprises the coordinated action.

25. A sorting system, comprising:

one or more sensors configured to capture image data corresponding to a set of objects being transported through a base sorting line;

a first sorting device and a second sorting device located along the base sorting line, wherein each of the first sorting device and the second sorting device is configured to perform diverting actions to separate materials associated with a designated category off from the base sorting line; and one or more processors configured to:

receive clog-related feedback from the second sorting device;

receive the image data from the one or more sensors;

determine a subset of objects from the set of objects that are associated with the designated category based at least in part on the image data;

send a first set of data to the first sorting device to perform a first action comprising a diverting action on the subset of objects;

determine a coordinated action relative to the first action to be performed by the second sorting device based at least in part on the clog-related feedback; and send a second set of data to the second sorting device to perform a second action, wherein the second action is determined based at least in part on the image data, wherein the second action comprises the coordinated action.

26. A method, comprising:

receiving image data from one or more sensors, wherein the image data corresponds to a set of objects being transported through a base sorting line;

determining a subset of objects from the set of objects that are associated with a designated category based at least in part on the image data;

sending a first set of data to a first sorting device to perform a first action comprising a diverting action on the subset of objects, wherein the first sorting device and a second sorting device are located along the base sorting line, wherein each of the first sorting device and the second sorting device is configured to perform diverting actions to separate materials associated with the designated category off from the base sorting line;

receiving clog-related feedback from the second sorting device;

determining a coordinated action relative to the first action to be performed by the second sorting device based at least in part on the clog-related feedback; and sending a second set of data to the second sorting device to perform a second action, wherein the second action is determined based at least in part on the image data, wherein the second action comprises the coordinated action.

27. A sorting system, comprising:

one or more sensors configured to capture image data corresponding to a set of objects being transported through a base sorting line;

a first sorting device and a second sorting device located along the base sorting line, wherein each of the first sorting device and the second sorting device is configured to perform diverting actions to separate materials associated with a designated category off from the base sorting line; and one or more processors configured to:

receive the image data from the one or more sensors;

determine a subset of objects from the set of objects that are associated with the designated category based at least in part on the image data;

determine less than a threshold amount of target objects on the base sorting line based on the image data;

send a first set of data to the first sorting device to perform a first action comprising a diverting action on the subset of objects;

determine a coordinated action relative to the first action to be performed by the second sorting device based at least in part on the determination of less than the threshold amount of target objects on the base sorting line; and send a second set of data to the second sorting device to perform a second action, wherein the second action is determined based at least in part on the image data, wherein the second action comprises the coordinated action.

28. A method, comprising:

receiving image data from one or more sensors, wherein the image data corresponds to a set of objects being transported through a base sorting line;

determining a subset of objects from the set of objects that are associated with a designated category based at least in part on the image data;

determining less than a threshold amount of target objects on the base sorting line based on the image data;

sending a first set of data to a first sorting device to perform a first action comprising a diverting action on the subset of objects, wherein the first sorting device and a second sorting device are located along the base sorting line, wherein each of the first sorting device and the second sorting device is configured to perform diverting actions to separate materials associated with the designated category off from the base sorting line;

determining a coordinated action relative to the first action to be performed by the second sorting device based at least in part on the determination of less than the threshold amount of target objects on the base sorting line; and sending a second set of data to the second sorting device to perform a second action, wherein the second action is determined based at least in part on the image data, wherein the second action comprises the coordinated action.

* * * * *